United States Patent
Yoshizawa

(10) Patent No.: US 10,652,066 B2
(45) Date of Patent: May 12, 2020

(54) DEVICE, METHOD, AND PROGRAM FOR IDENTIFYING A PREFERRED CODEBOOK FOR NON-ORTHOGONAL MULTIPLEXING/NON-ORTHOGONAL MULTIPLE ACCESS

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/566,825

(22) PCT Filed: Feb. 23, 2016

(86) PCT No.: PCT/JP2016/055287
§ 371 (c)(1),
(2) Date: Oct. 16, 2017

(87) PCT Pub. No.: WO2016/185749
PCT Pub. Date: Nov. 24, 2016

(65) Prior Publication Data
US 2018/0123855 A1    May 3, 2018

(30) Foreign Application Priority Data
May 15, 2015   (JP) ................ 2015-099626

(51) Int. Cl.
*H04L 27/26* (2006.01)
*H04J 13/16* (2011.01)
*H04B 7/0456* (2017.01)
*H04W 88/08* (2009.01)

(52) U.S. Cl.
CPC ....... *H04L 27/2627* (2013.01); *H04B 7/0456* (2013.01); *H04J 13/16* (2013.01); *H04J 2013/165* (2013.01); *H04W 88/08* (2013.01)

(58) Field of Classification Search
CPC ...... H04L 27/2627; H04J 13/16; H04W 88/08
See application file for complete search history.

(56) References Cited

U.S. PATENT DOCUMENTS

| 2014/0140360 A1 | 5/2014 | Nikopour et al. |
| 2016/0013849 A1 | 1/2016 | Kakishima et al. |
| 2016/0150544 A1* | 5/2016 | Nikopour ............ H04B 17/336 370/329 |
| 2017/0126455 A1* | 5/2017 | Vilaipornsawai ... H04L 27/2617 |

FOREIGN PATENT DOCUMENTS

| JP | 2010-158021 A | 7/2010 |
| JP | 2014-175810 A | 9/2014 |

OTHER PUBLICATIONS

International Search Report dated Apr. 19, 2016, in PCT/JP2016/055287, filed Feb. 23, 2016.

* cited by examiner

*Primary Examiner* — Rhonda L Murphy
(74) *Attorney, Agent, or Firm* — Xsensus LLP

(57) ABSTRACT

To enable a base station to select a more preferable codebook, a device includes a communication unit configured to perform radio communication and a control unit configured to perform control such that information regarding a codebook for multi-dimensionally modulating input data into a codeword is transmitted from the communication unit to a base station.

20 Claims, 24 Drawing Sheets

FIG. 3

CODEBOOK 1
$(0,0) \rightarrow x_{11} = (x_{111}, x_{112}, 0, 0)$
$(0,1) \rightarrow x_{12} = (x_{121}, x_{122}, 0, 0)$
$(1,0) \rightarrow x_{13} = (x_{131}, x_{132}, 0, 0)$
$(1,1) \rightarrow x_{14} = (x_{141}, x_{142}, 0, 0)$ CODEBOOK 2
$(0,0) \rightarrow x_{21} = (0, 0, x_{213}, x_{214})$
$(0,1) \rightarrow x_{22} = (0, 0, x_{223}, x_{224})$
$(1,0) \rightarrow x_{23} = (0, 0, x_{233}, x_{234})$
$(1,1) \rightarrow x_{24} = (0, 0, x_{243}, x_{244})$ CODEBOOK 3
$(0,0) \rightarrow x_{31} = (x_{311}, 0, x_{313}, 0)$
$(0,1) \rightarrow x_{32} = (x_{321}, 0, x_{323}, 0)$
$(1,0) \rightarrow x_{33} = (x_{331}, 0, x_{333}, 0)$
$(1,1) \rightarrow x_{34} = (x_{341}, 0, x_{343}, 0)$ CODEBOOK 4
$(0,0) \rightarrow x_{41} = (0, x_{412}, 0, x_{414})$
$(0,1) \rightarrow x_{42} = (0, x_{422}, 0, x_{424})$
$(1,0) \rightarrow x_{43} = (0, x_{432}, 0, x_{434})$
$(1,1) \rightarrow x_{44} = (0, x_{442}, 0, x_{444})$ CODEBOOK 5
$(0,0) \rightarrow x_{51} = (x_{511}, 0, 0, x_{514})$
$(0,1) \rightarrow x_{52} = (x_{521}, 0, 0, x_{524})$
$(1,0) \rightarrow x_{53} = (x_{531}, 0, 0, x_{534})$
$(1,1) \rightarrow x_{54} = (x_{541}, 0, 0, x_{544})$ CODEBOOK 6
$(0,0) \rightarrow x_{61} = (0, x_{612}, x_{613}, 0)$
$(0,1) \rightarrow x_{62} = (0, x_{622}, x_{623}, 0)$
$(1,0) \rightarrow x_{63} = (0, x_{632}, x_{633}, 0)$
$(1,1) \rightarrow x_{64} = (0, x_{642}, x_{643}, 0)$

ANTENNA PORT 15

ANTENNA PORT 5

DEVICE, METHOD, AND PROGRAM FOR IDENTIFYING A PREFERRED CODEBOOK FOR NON-ORTHOGONAL MULTIPLEXING/NON-ORTHOGONAL MULTIPLE ACCESS

TECHNICAL FIELD

The present invention relates to a device, a method, and a program.

BACKGROUND ART

In recent years, various new radio access schemes have been discussed in various fields for the next fifth generation radio scheme of Long Term Evolution (LTE). In particular, non-orthogonal multiplexing and non-orthogonal multiple access have been discussed. Amid this situation, a new multiple access scheme called sparse code multiple access (SCMA) has been proposed.

Patent Literature 1, for example, discloses examples of a codeword generation technique using codebooks of SCAM and a designing technique of the codebooks.

CITATION LIST

Patent Literature

Patent Literature 1: US 2014/0140360A

DISCLOSURE OF INVENTION

Technical Problem

In SCMA, codewords of a plurality of layers that are subject to multiplexing are generated from data of the layers on the basis of codebooks for the layers. In addition, respective signal elements included in the codewords of the plurality of layers are mapped to a plurality of radio resources. At this time, the signal elements each corresponding to the plurality of layers are non-orthogonally multiplexed and transmitted. In this configuration, frequency use efficiency can be improved in SCMA.

Meanwhile, in order to improve frequency use efficiency by non-orthogonally multiplexing the signal elements each corresponding to the plurality of layers in SCMA, it is desirable for a base station to select a more preferable codebook.

Therefore, the present disclosure proposes a device, a method, and a program which enable abase station to select a more preferable codebook.

Solution to Problem

According to the present disclosure, there is provided a device including; a communication unit configured to perform radio communication; and a control unit configured to perform control such that information regarding a codebook for multi-dimensionally modulating input data into a codeword is transmitted from the communication unit to a base station.

In addition, according to the present disclosure, there is provided a device including: an acquisition unit configured to acquire information regarding a codebook for multi-dimensionally modulating input data into a codeword, from a terminal; and a selection unit configured to select the codebook after the information is acquired.

In addition, according to the present disclosure, there is provided a method including; performing radio communication; and performing, by a processor, control such that information regarding a codebook for multi-dimensionally modulating input data into a codeword is transmitted to a base station.

In addition, according to the present disclosure, there is provided a method to be used by a processor the method including: acquiring information regarding a codebook for multi-dimensionally modulating input data into a codeword, from a terminal; and selecting the codebook after the information is acquired.

In addition, according to the present disclosure, there is provided a program causing, a computer to perform: radio communication; and control such that information regarding a codebook for multi-dimensionally modulating input data into a codeword is transmitted to a base station.

In addition, according to the present disclosure, there is provided a program causing a computer to perform: acquisition of information regarding a codebook for multi-dimensionally modulating input data into a codeword, from a terminal; and selection of the codebook after the information is acquired.

Advantageous Effects of Invention

According, to the present disclosure described above, a device, a method, and a program which enable a base station to select a more preferable codebook are provided.

Note that the effects described above are not necessarily limitative. With or in the place of the above effects, there may be achieved my one of the effects described in this specification or other effects that may be grasped from this specification.

BRIEF DESCRIPTION OF DRAWINGS

FIG. 3 is an explanatory diagram for describing examples of codebooks.

MODE(S) FOR CARRYING OUT THE INVENTION

Figure 1:
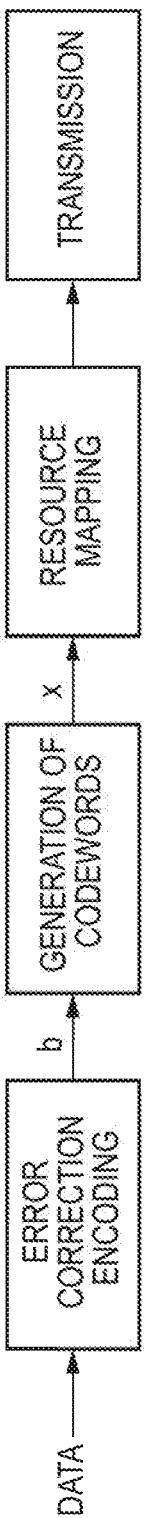
FIG. 1 is an explanatory diagram for describing an example of a schematic process of SCMA.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Introduction
1.1. SCMA
1.2. Application examples of SCMA
1.3. Example of CQI and reference signal
1.4. Technical problem
2. Schematic configuration of system
3. Configuration of each device
3.1. Configuration of base station
3.2. Configuration of terminal device
4. Technical features
5. Process flow
6. Application examples
6.1 Application examples with regard to base station
6.2. Application examples with regard to terminal device
7. Conclusion

1. Introduction

As an introduction, SCMA, an example of CQI and reference signals, and technical problems will be described with reference to FIGS. 1 to 8.

1.1. SCMA

First, SCMA will be described with reference to FIGS. 1 to 4.

(1) Schematic Process Flow

FIG. 1 is an explanatory diagram for describing an example of a schematic process of SCMA.

In SCMA, for example, error correction encoding is performed and a codeword x is generated from data (binary data) b that has undergone the error correction encoding on the basis of a codebook. Specifically, the codebook is, for example, information indicating correspondences between data candidates and codewords, and data b is converted into a codeword x corresponding to the data b in the codebook one to one. Note that codebooks for each layer are prepared for the purpose of layer separation.

Further, each signal element included in the generated codewords is mapped to a corresponding radio resource. For example, codewords of a plurality of layers are multiplexed first, and then each signal element included in the multiplexed codewords is mapped to a corresponding radio resource. Alternatively, for each of a plurality of layers, each signal element included in the codewords of the layers may be mapped to a corresponding radio resource, and then two or more signal elements mapped to the same radio resource (i.e., signal elements of different layers) may be multiplexed.

Then, the signal elements mapped to the radio resource are transmitted.

As described above, codewords of a plurality of layers are transmitted on the same radio resource. That is, the radio resource is shared by the plurality of layers. For this reason, SCMA is a non-orthogonal access scheme, not an orthogonal access scheme like OFDMA.

(2) Generation of Codeword

Figure 2:
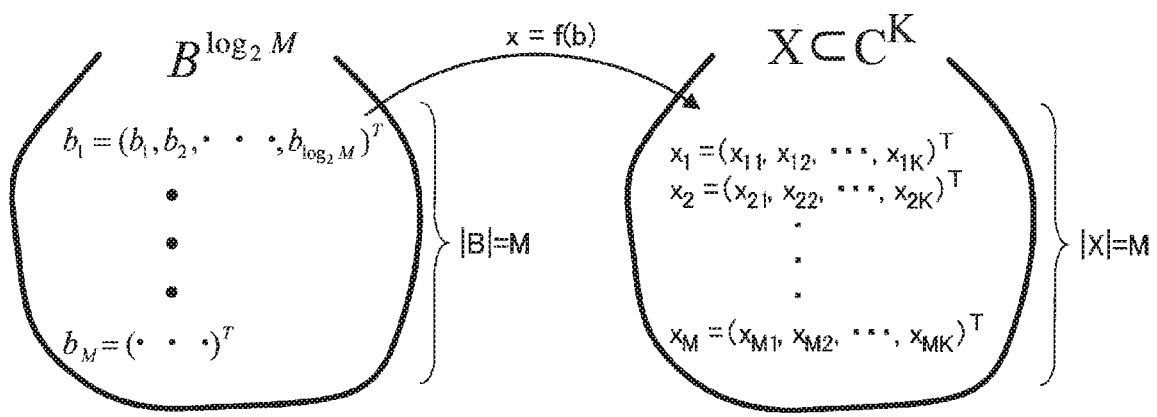
FIG. 2 is an explanatory diagram for describing an example of generation of codewords based en codebooks.

FIG. 2 is an explanatory diagram for describing an example of generation of codewords based on codebooks. Referring to FIG. 2, data candidates $b_i$ and codewords $x_j$ are shown. Sizes of the codebooks, i.e., the number of data candidates $b_i$ and the number of codewords $x_j$, are both M. In this case, data that is input information is, for example, a vector including bits as elements and has a length of $\log_2 M$. In addition, a codeword that is output information is a vector including a complex number as a signal element and has the same length as the number of radio resources K to be used is transmission of codewords. Thus, a codebook can also be said to be a function in which input information and output information are both vectors. The codewords that are output information are required to satisfy a desired condition suitable for layer multiplexing.

(3) Example of Codebooks

FIG. 3 is an explanatory diagram for describing examples of codebooks. Referring to FIG. 3, codebooks 1 to 6 are shown. The codebooks 1 to 6 are codebooks for Layer 1 to Layer 6. As such, codebooks for each layer are prepared in SCMA. In this example, data that is input information is 2-bit data, and the number of data candidates is 4. Thus, the number of codewords in each codebook is also 4. 2 of 4 signal elements (i.e., complex numbers) are 0 in a codeword of each codebook, and 2 different codewords are sparse. In addition, the other 2 of the 4 signal elements (in other words, a four-dimensional constellation) in the codeword of each codebook are not 0. That is, the number of signal elements N that are not 0 among the 4 signal elements is 2.

(4) Example of Resource Mapping

Figure 4:
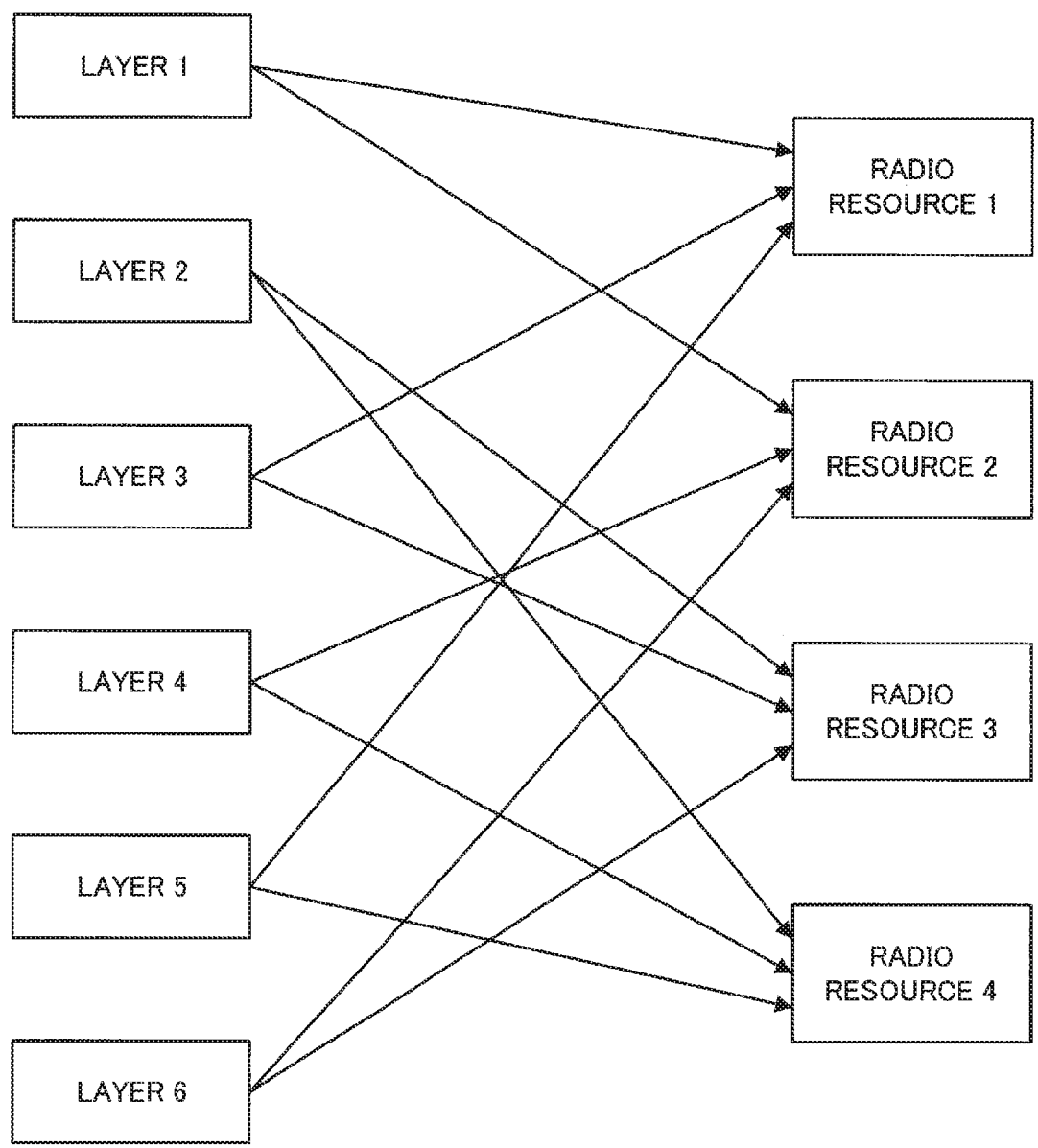
FIG. 4 is an explanatory diagram for describing an example of resource mapping of codebooks.

FIG. 4 is an explanatory diagram for describing an example of resource mapping of codebooks. Referring to FIG. 4, 6 layers and 4 radio resources are shown. In this example, the number of signal elements in a codeword of each layer is 4, and thus 4 radio resources are prepared. For example, signal elements that are not 0 (i.e., 2 signal elements) among 4 signal elements included in the codeword of each layer are mapped to a corresponding radio resource. In other words, in the example illustrated in FIG. 4, signals of a four-dimensional constellation are split into two two-dimensional constellations and mapped. Specifically, for example, a first signal element in a codeword of Layer 1 is mapped to radio resource 1, and a second signal element in the codeword of Layer 1 is mapped to radio resource 2. Further, as another example, a first signal element in a codeword of Layer 3 is mapped to radio resource 1, and a third signal element in, the codeword of Layer 3 is mapped to radio resource 3.

In this example, an allowable number of layers J is equal to 2 combinations among the 4 radio resources ($_4C_2=6$). When 6 layers are mapped to 4 radio resources as above, realized overhead is 150%.

(5) Process on Reception Side

In SCMA, a transmission side performs multiplexing of sparse codewords as described above. Meanwhile, a technique called, for example, a message passing algorithm (MPA) using an iterative operation is used on a reception side. According to the message passing technique, a reception device refers to, for example, reception signals of 4 radio resources and estimates an input vector that maximizes a posterior probability of the reception signals.

More generally, for example, codewords of J layers are mapped to K radio resources. In this case, if a codeword of a j-th layer is indicated as $x_j=(x_{1j}, \ldots, x_{Kj})$, a reception signal $y_k$ on a k-th radio resource is expressed as below.

$$y_k = h_k \sum_{j=1}^{J} x_{kj} + n_k \quad \text{[Math. 1]}$$

Here, $h_k$ represents a channel characteristic of the k-th radio resource, and $n_k$ represents a noise component added to the k-th radio resource. In this case, $\hat{X}$ below is an estimated value of an input vector $X=(x_1, x_2, \ldots, x_J)$.

$$\hat{X} = \arg\max_x p(X \mid y) \quad \text{[Math. 2]}$$

Using the demodulation method described above, the reception side further uses successive interference cancellation (SIC). In SIC, the reception device sequentially cancels reception signals of other layers as interference components in the course of demodulating reception signals of a certain layer. Through such a process, reception signals of the layers are separated and a reception signal of a desired layer is obtained.

1.2. Application Examples of SCMA

SCMA is expected to obtain satisfactory characteristics even when beamforming is not used during multiuser communication due to the non-orthogonality of the multiplexing method described above.

Specifically, the document "SCMA for Downlink Multiple Access of 5G Wireless Networks" in IEEE Globecom 2014 states that SCMA is superior in a multiuser environment due to layer separation and multiplexing using codebooks.

In LTE, a method of implementing multiple-input and multiple-output (MIMO) realized without feedback on information relating to pre-coding being given by a terminal device is called open-loop MIMO as described above. In open-loop MIMO, the terminal device does not transmit a precoder matrix indicator (PMI) for selecting a precoder. Thus, in open-loop MIMO, a load of giving feedback in uplink can be reduced and improvement in tolerance for channel variation can also be expected.

For the above reasons, open-loop MIMO is a useful method for terminal devices that move fast, and will still be considered to be an important transmission mode even in a future cellular communication such as SCMA.

Open loop MIMO has been defined as a transmission mode 3 (TM3) LTE in the past. In the TM3, only a channel quality indicator (CQI) and a rank indicator (RI) are reported. The RI is a parameter for indicating an independent channel and is very important information in MIMO communication. In addition, the CQI is for a terminal device to instruct a base station modulation and a coding rate in desired downlink, and thus is necessary for the base station to perform adaptive modulation and desirable scheduling.

1.3. Example of CQI and Reference Signal

Figure 5:
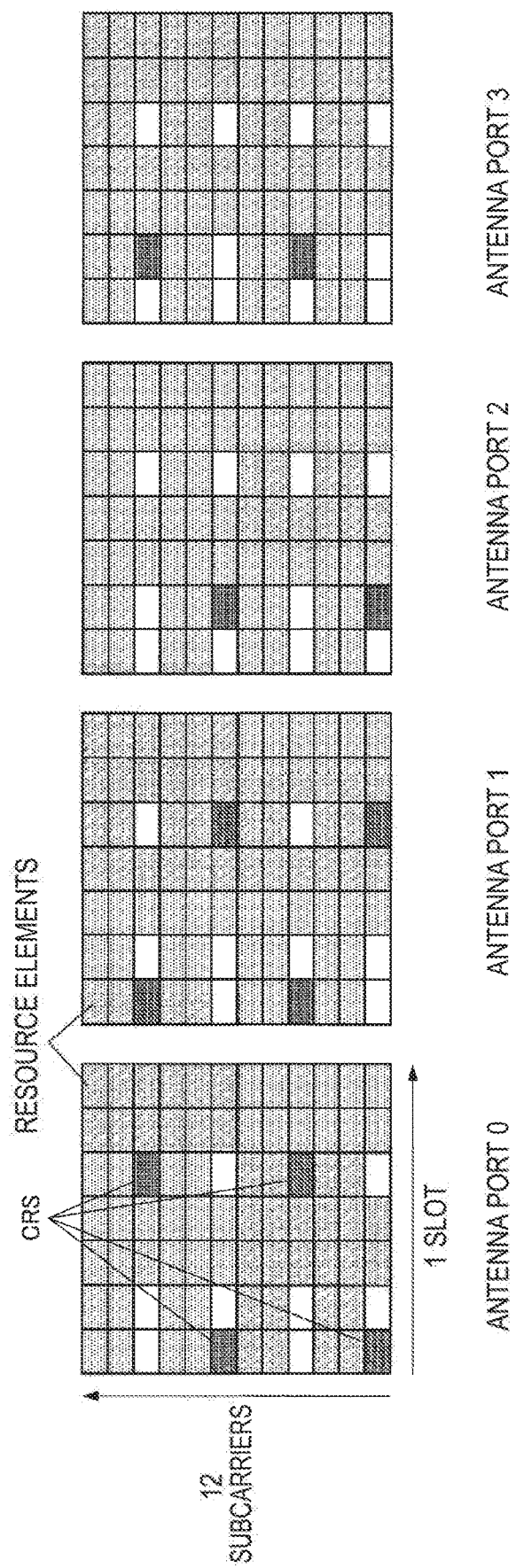
FIG. 5 is an explanatory diagram for describing CRSs.

Next, an example of a channel quality indicator (CQI) and a reference signal used in LTE will be described with reference to FIG. 5 to FIG. 7.

(CQI)

First, the CQI will be described. A terminal device transmits the CQI to a base station to enable the base station to perform appropriate adaptive modulation in LTE. The CQI is 16-stage channel state information (CSI) indicated with 4 bits. A terminal device can give an instruction on a modulation method (one QPSK, 16QAM, and 64QAM) and a coding rate (from 0.08 to 0.93) to the base station by using the CQI.

In this case, the base station transmits a CSI request to the terminal device to request the CQI by using downlink control information (DCI) transmitted on a physical downlink control channel (PDCCH). Upon receiving the CSI request, the terminal device measures signal quality, such as an SN ratio, in a predetermined range of resource blocks and calculates a CQI value on the basis of the measurement result. Then, the terminal device transmits the calculated CQI value to the base station 4 subframes later from the reception of the CSI request.

(CRS)

Next, cell-specific reference signals (CRSs) will be described as examples of reference signals used in LTE. FIG. 5 is, for example, an explanatory diagram for describing the CRSs, illustrating examples of reference signals from antenna ports 0 to 3 for supporting MIMO using 4 antennas.

In LTE, the CRSs are mapped in a direction deviating by a remainder value of the modulus 6 for a cell ID value toward a subcarrier direction in order to reduce interference in the CRSs between adjacent cells. Such reference signals are inserted into all subframes in downlink in LTE.

Among the CRSs, no transmission of signals from a resource element in which a reference signal of another antenna port is present is performed to avoid interference in the reference signals of respective antenna ports. Thus, orthogonality between the reference signals is ensured.

Note that a symbol value of a CRS in LTE is given using the following formula, when a slot number is set to $n_s$, an OFDM symbol number is set to l, and an index of a resource block is set to m. In the formula below, the left side indicates the symbol value of the CRS.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Math. 3]}$$

$$m = 0, 1, \ldots, 2N_{RB}^{max,DL} - 1$$

Note that, in the above-described formula, c(n) indicates an $n^{th}$ value of a Gold sequence having a sequence length of $2^{31}-1$ and indicates an exclusive OR of two M sequences $x_1(n+Nc)$ and $x_2(n+Nc)$. That is, c(n) is given using the following formula.

$$c(n) = (x_1(n+N_c) + x_2(n+N_c)) \bmod 2 \quad \text{[Math. 4]}$$

However, in the above-described formula, $N_c$ is a localization number and $N_c$=1600. In addition, each M sequence in the above-described formula is given using the following formulas.

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Math. 5]}$$

Note that an initial value $x_1(i)$ of the M sequence indicated b $x_1(n+N_c)$ is expressed using the following formula.

$$x_1(0) = 1, x_1(n) = 0, n = 1, 2, \ldots, 30 \quad \text{[Math. 6]}$$

In addition, an initial value $x_2(i)$ of the M sequence indicated by $x_2(n+N_c)$ is a 31-bit binary sequence satisfying the following formula.

$$c_{init} = \sum_{i=0}^{30} x_2(i) \cdot 2^i \quad \text{[Math. 7]}$$

Note that $c_{init}$ is a value that depends on a slot number ns, the OFDM symbol number l, a physical cell ID$N_{ID}^{cell}$, and a cyclic prefix type $N_{CP}$, and is given using the following formula. Note that, in the case of a normal CP, $N_{CP}$=1 is set.

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} \quad \text{[Math. 8]}$$

As described above, a past CRS is a signal obtained by QPSK-modulating a pseudo random number generated using a time/frequency position of a resource used for transmission and an initial value that depends on an ID of a base station that performs the transmission.

When a plurality of antennas are used, the CRSs are transmitted with different resource elements for each of the antennas, as described above. Accordingly, interference between the antennas is avoided, and channel matrixes of the respective antennas can be measured more accurately.

The terminal device receives the reference signals generated as described above and excludes fluctuating frequency error components as pilot signals during data decoding, on the basis of the reference signals. In addition, the terminal device measures SN ratios or the like of the CRSs and transmits a CQI that is desirable for the terminal to the base station.

(CSI-RS)

Next, channel state information reference signals (CSI-RSs) will be described as an example of a reference signal used in LTE.

In LTE, there are cases in which a level of transmission power of a CRS is set to be higher than a level of power of user data. In such a case, interference may occur in adjacent cells during transmission of the CRSs.

Thus, a means for determining a CQI with higher accuracy using CSI-RSs newly provided is provided in a transmission mode 9 (TM9) of LTE. For example, FIG. 6 is an explanatory diagram for describing CSI-RSs, illustrating an example of CSI-RSs transmitted from an antenna port 15.

Figure 6:
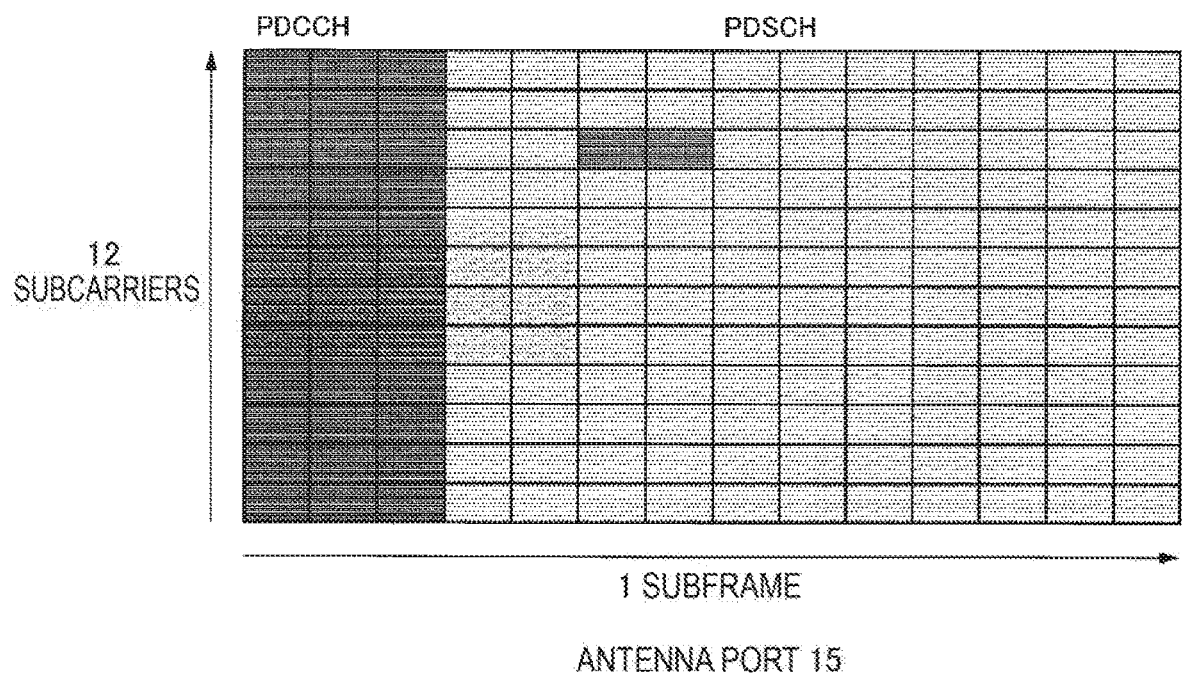
FIG. 6 is an explanatory diagram for describing CSI-RSs.

As illustrated in FIG. 6, since the CSI-RSs are sent to a user data region (a physical downlink shared channel or PDSCH), transmission power thereof can be suppressed to have a relatively low level, and thus inter-cell interference is small. In addition, the terminal device can also measure an interfering wave from an adjacent cell by stopping transmission of the CSI-RSs from a serving cell.

The CSI-RSs are set using configuration information for the CSI-RSs in a radio resource control (RRC) connection setup, an RRC connection reconfiguration, and an RRC connection re-establishment. Note that the CSI-RSs are deployed at different positions from those of resource elements to which CRSs are mapped to coexist with CRSs.

The CSI-RSs enable execution of link adaptation in a more appropriate downlink mode by enabling a higher accuracy determination of a CQI using minimum resources s described above.

Note, that a symbol value of a CSI-RS is defined using a similar algorithm to that of the CRSs. That is, the symbol value of the CSI-RS is given using the following formula. In the formula below, the left side indicates a symbol value of the CSI-RS.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Math. 9]}$$

$$m = 0, 1, \ldots, 2N_{RB}^{max,DL} - 1$$

In addition, an initial value $C_{init}$ of a Gold sequence is given using the following formula.

$$c_{init} = 2^{10} \cdot (7 \cdot (n_s+1) + l + 1) \cdot {}^{*}2 \cdot N_{ID}^{CSI} + 1) + 2 \cdot N_{ID}^{CSI} + N_{CP} \quad \text{[Math. 10]}$$

Note that, at this time, the above-described $N_{ID}^{cell}$ is used as $N_{ID}^{CSI}$ unless a particular instruction is given as a value of $N_{ID}^{CSI}$ in a high-order layer.

(DM-RS)

Next, demodulation reference signals (DM-RSs) described as an example of a reference signal used in LTE.

The DM-RSs are reference signals that are different for every user (user-specific) and are used in transmission modes in which beamforming is used, such as a TM7, a TM8 and a TM9.

Like data, the DM-RSs are subject to beamforming, and are transmitted by the base station by being multiplied by a coefficient of a precoder.

Figure 7:
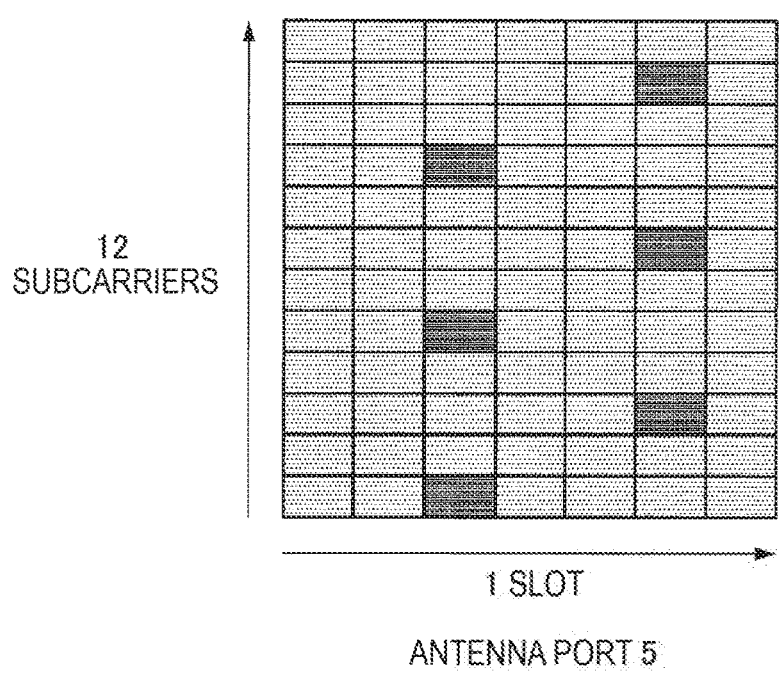
FIG. 7 is an explanatory diagram for describing DM-RSs.

For example, FIG. 7 is an explanatory diagram for describing DM-RSs, illustrating an example of DM-RSs of an antenna port 5. In addition, a symbol value of a DM-RS to be used in the TM7 at the antenna port 5 is expressed using the following formula. In the formula below, the left side indicates a symbol value of a DM-RS.

$$r_{n_s}(m) = \frac{1}{\sqrt{2}}(1 - 2 \cdot c(2m)) + j\frac{1}{\sqrt{2}}(1 - 2 \cdot c(2m+1)), \quad \text{[Math. 11]}$$

$$m = 0, 1, \ldots, 12N_{RB}^{PDSCH} - 1$$

In addition, the initial value $C_{init}$ of the above-described sequence (Gold sequence) is given using the following formula.

$$c_{init} = 2^{10} \cdot (7 \cdot (n_s+1) + l + 1) \cdot (2 \cdot N_{ID}^{CSI} + 1) + 2 \cdot N_{ID}^{CSI} + N_{CP} \quad \text{[Math. 12]}$$

The DM-RS used in the TM7 has a symbol value that depends on a cell ID and a radio network temporary ID (RNTI) as described above.

1.4. Technical Problem

Next, a technical problem according to an embodiment of the present disclosure will be described.

In SCMA, non-orthogonal user multiplexing is performed using codebooks as described above. For this reason, cancellation of interference between users is necessary in SCMA. According to a system that allows a certain extent of such interference between users, multiuser MIMO is considered to be executed with high efficiency without advanced beamforming.

However, provision of appropriate information from a terminal to a base station, such as a CQI in LTE, is considered to still be necessary to also perform appropriate adaptive modulation or scheduling in SCMA.

For example, in a TM3 of LTE, a CQI is determined by receiving a CRS. Since a level of transmission power of the CRS is normally set to be higher than that of user data in LTE, interference its CRSs between adjacent cells may be a problem. Thus, a new means for determining a CQI with higher accuracy by using a CSI-RS in the TM9 has been provided.

Specifically, since a CSI-RS is sent in a user data region (PDSCH), transmission power thereof can be suppressed to be a relative low level, and thus interference between cells can be reduced as described above. Furthermore, transmission of the CSI-RS can also be stopped to measure an interfering wave of adjacent cells in the terminal device.

Arbitrary QPSK symbols based on sequences with pseudo random numbers are used as reference signals of a related art to be used to determine a CQI like the CRS, the CSI-RS, and the like.

Here, characteristics of SCMA will be focused on. SCMA is a method for executing non-orthogonal multiplexing using codebooks and multiplexing data of a plurality of users in the same resource as described above. In addition, a different way of mapping constellations from that of the related art is performed in SCMA, such as using multi-dimensional constellations, and splitting the constellations and mapping them to a plurality of resource elements.

Figure 8:
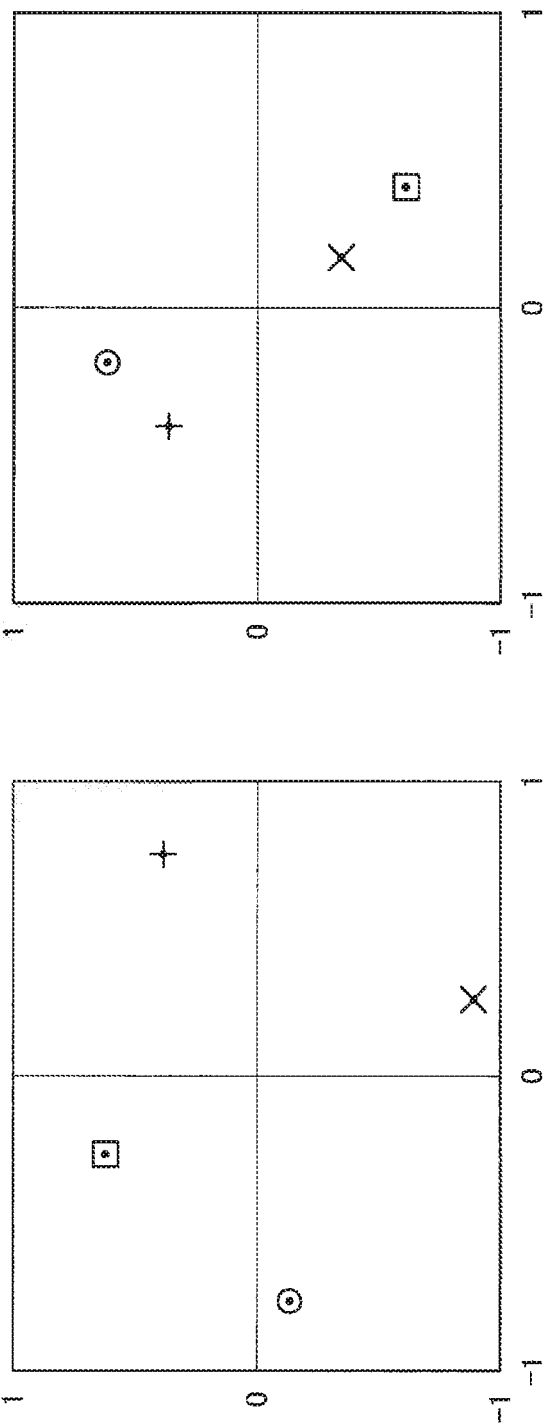
FIG. 8 is an explanatory diagram for describing mapping of constellations in SCMA.

For example, FIG. 8 is an explanatory diagram for describing mapping of constellations in SCMA, illustrating an example of a case in which signals of a four-dimensional constellation are divided into two two-dimensional constellations and mapped. In SCMA, frequency use efficiency can be further improved by non-orthogonally multiplexing signals (i.e., non-orthogonally multiplexing signals of a plurality of layers) by using such multi-dimensional constellations.

Meanwhile, it is desirable for a base station to select a more preferable codebook (also, a combination of codebooks, i.e., a codebook group) to improve frequency use efficiency by non-orthogonally multiplexing multi-dimensional constellations mapped to a plurality of resources, as in SCMA.

In particular, when data is split into multi-dimensional constellations and then mapped to a plurality of resources and signals of a plurality of layers are non-orthogonally multiplexed, as in SCMA, there is a possibility of a difference in signal levels (levels of power) being made between resources in accordance with the selected codebook. In such a circumstance in which the levels of signals are uneven, as described above, a terminal device may have difficulty accurately measuring channel information with reference signals based on symbols of past QPSK. Thus, a case in which the terminal device has difficulty acquiring information for causing the base station to select a combination of more desirable codebooks with past reference signals can be assumed.

Therefore, the present disclosure proposes a method of providing channel information, which is equivalent to a past CQI, and a reference signal transmitted from a base station to a terminal device from the terminal device to the base station, as a mechanism for the base station to realize selection of a more preferable codebook.

2. Schematic Configuration of System

Figure 9:
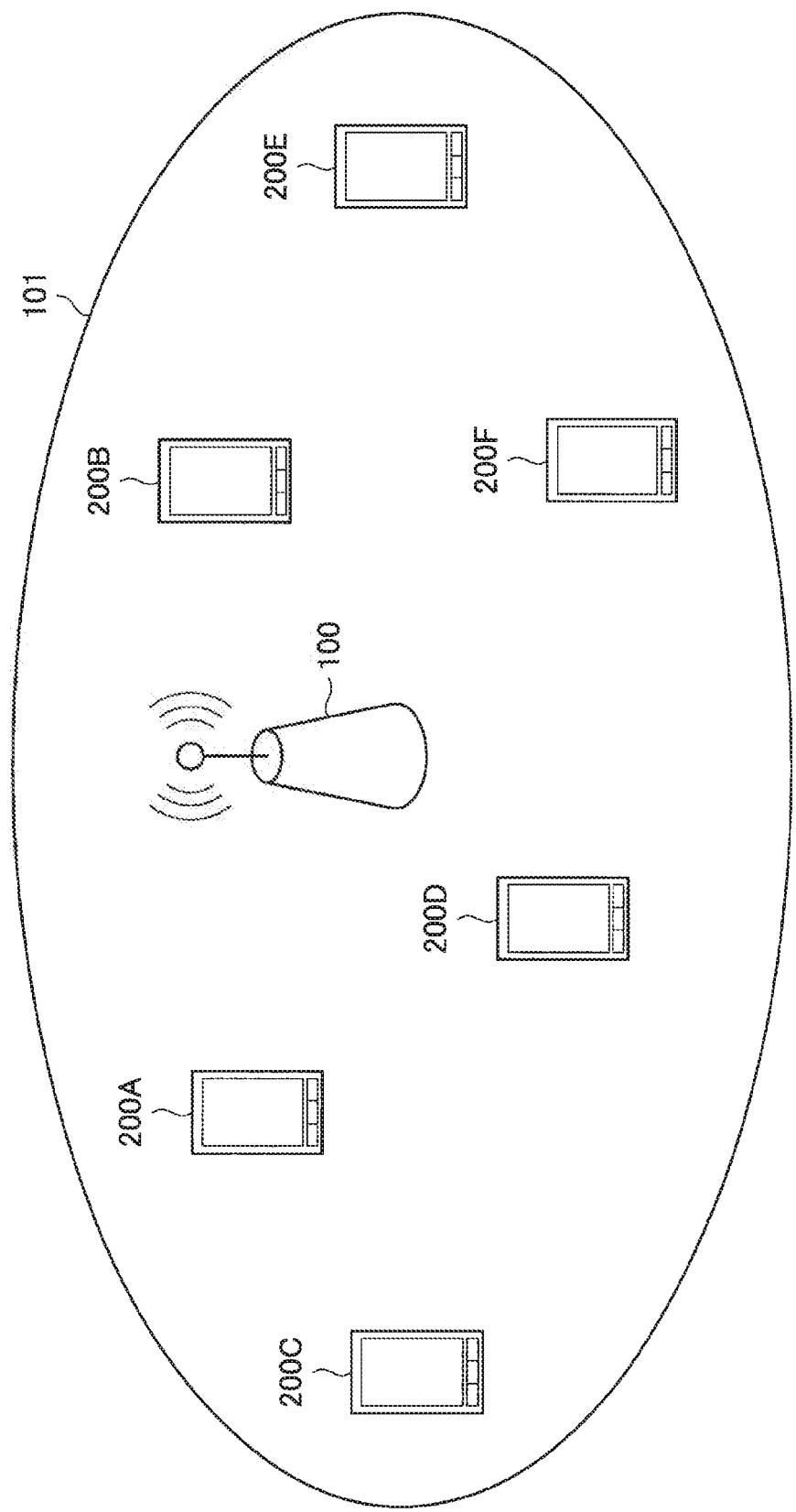
FIG. 9 is an explanatory diagram illustrating an example of a schematic configuration of a system according to one embodiment of the present disclosure.

Next, a schematic configuration of a system according to an embodiment of the present disclosure will be described with reference to FIG. 9. FIG. 9 is an explanatory diagram illustrating an example of a schematic configuration of the system 1 according to the embodiment of the present disclosure. As illustrated in FIG. 9, the system 1 includes a base station 100 and terminal devices 200. Note that the plurality of terminal devices 200 may be included. In the example illustrated in FIG. 9, for example, the system 1 includes terminal devices 200A to 200F. Note that, unless the terminal devices 200A to 200F are particularly distinguished, the terminal devices may be simply referred to as "the terminal devices 200" in description below.

(1) Base Station 100

The base station 100 is a base station of a mobile communication system (or a cellular system). The base station 100 performs radio communication with terminal devices (e.g., the terminal device 200) positioned within a cell 101. The base station 100, for example, transmits downlink signals to terminal devices and receives uplink signals from terminal devices.

(2) Terminal Devices 200

Each of the terminal devices 200 is a terminal device that can communicate in the mobile communication system (or cellular system). The terminal device 200 performs radio communication with base stations (e.g., the base station 100). The terminal device 200, for example, receives downlink signals from base stations and transmits uplink signals from base stations.

(3) Non-Orthogonal Multiplexing Using Codebook

In an embodiment of the present disclosure, in particular, non-orthogonal multiplexing/non-orthogonal multiple access using a codebook is performed.

The codebook is, for example, a codebook of sparse codes (SCs). The non-orthogonal multiple access using the codebook is SCMA, and the non-orthogonal multiplexing using the codebook is multiplexing in SCMA.

Non-orthogonal Multiplexing/non-orthogonal multiple access using codebooks are performed in, for example, downlink. Alternatively, non-orthogonal multiplexing/non-orthogonal multiple access using codebooks may be performed in uplink.

3. Configuration of Each Device

Next, examples of configurations of the base station 100 and the terminal device 200 according to the embodiment of the present disclosure will be described with reference to FIGS. 10 and 11.

3.1. Configuration of Base Station

First, an example of a configuration of the base station 100 according to the embodiment of the present disclosure will be described with reference to FIG. 10. FIG. 10 is a block diagram illustrating the example of the configuration of the base station 100 according to the embodiment of the present disclosure. As illustrated in FIG. 10, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. For example, the processing, unit 150 includes an allocation unit 151, a selection unit 153, an information acquisition unit 155, a reporting unit 157, and a communication processing unit 159. Note that the processing unit 150 can further include other constituent elements than the constituent elements. That is, the processing unit 150 can perform operations other than operations of the constituent elements.

The allocation unit 151, the selection unit 153, the information acquisition unit 155, the reporting unit 157, and the communication processing unit 159 will be described below in detail.

3.2. Configuration of Terminal Device

Next, an example, of a configuration of the terminal device 200 according to the embodiment of the present disclosure will be described with reference to FIG. 11. FIG. 11 is a block diagram illustrating the example of the configuration of the terminal device 200 according to the embodiment of the present disclosure. As illustrated in FIG. 11, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. For example, the processing unit 240 includes an information acquisition unit 241 and a communication processing unit 243. Note that the processing unit 240 may further include a structural element other than these structural elements. That is, the processing unit 240 may perform operation other than the operation of these structural elements.

The information acquisition unit 241 and the communication processing unit 243 will be described below in detail.

4. Technical Features

Next, technical features according to the embodiment of the present disclosure will be described with reference to FIGS. 12 to 21.

(1) Selection of Codebook Group

The base station 100 (the communication processing unit 159) requests, for example, an indication for selecting a codebook group (which may be referred to as a "codebook indication" hereinbelow) from the terminal device 200. In addition, the base station 100 (the communication processing unit 159) may transmit a reference signal for the codebook indication to the terminal device 200 following the request for the codebook indication. Then, the base station 100 (the communication processing unit 159) receives the codebook indication from the terminal device 200, which is a response to the request (or to the reference signal).

Accordingly, the base station 100 (the selection unit 153) can select a more preferable codebook group among a plurality of codebook groups on the basis of the received codebook indication.

Note that, after the selection of the codebook group, the base station 100 (the communication processing unit 159) performs communication processing on a plurality of layers on the basis of the selected codebook group.

(a) Codebook Group

Each terminal that performs communication using SCMA holds not only a codebook of its own layer but also a codebook of another layer simultaneously multiplexed in order to cancel another multiplexed signal serving as an interfering wave when data that is multiplexed in SCMA is demodulated.

In the above-described SCMA, group of a series of codebooks used to multiplex signal elements of codewords generated for a series of layers will be referred to as a codebook group here for the sake of convenience. Note that a combination of codebooks included in a codebook group serves as a combination that is likely to provide constellations of more preferable SCMA signals that ensure a maximum minimum inter-code distance and a minimum level of signal power.

(b) Reference Signal

Figure 12:
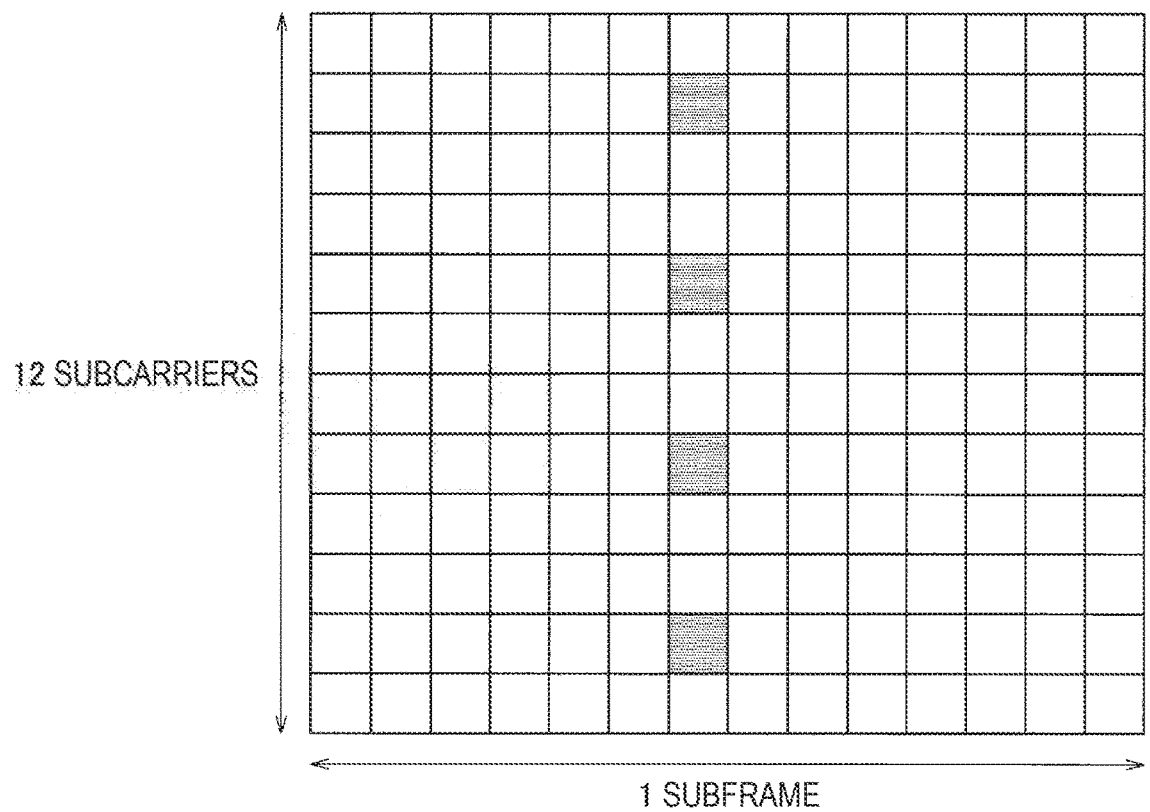
FIG. 12 is an explanatory diagram for describing an example of a reference signal according to the embodiment.

Next, an example of a reference signal used for a codebook indication will be described. FIG. 12 is, for example, an explanatory diagram for describing an example of a reference signal according to the embodiment. Note that, in description below, a reference signal for causing the terminal device 200 to transmit to codebook indication may be referred to as a "SCMA-RS" to distinguish the reference signal from other reference signals. In addition, in the present description, a case in which respective signal elements of codewords generated for each of 6 layers is mapped to 4 radio resources during communication using SCMA, as illustrated in FIG. 4, will be exemplified.

In the example illustrated in FIG. 12, 4 resource elements for every 12 subcarriers and 1 subframe are used during the transmission of the SCMA-RS. Note that the number of resource elements occupied by the SCMA-RS is more desirably a necessary minimum number, like the above-described CSI-RS. In addition, the SCMA-RS is desirably deployed in a user data region (PDSCH) like the CSI-RS in terms of a pair interfering property. In addition, transmission power of the SCMA-RS is desirably set to a lower level than that of a CRS.

In addition, it is desirable not to superimpose, the resource elements in which the SCMA-RS is deployed with an existing reference signal (e.g., a CRS, a CSI-RS, a DM-RS, etc.). That is, it is desirable to deploy the SCMA-RS in other resource elements different from the resource elements in which the existing reference signal is deployed.

Note that it is a matter of course that the above-described deployment is, not to be applied to a case in which no restriction based on an existing standard is imposed on communication using SCMA. A specific example thereof is a case in which time slots dedicated to the communication using SCMA are provided and the time slots are not affected by a restriction based on an existing standard.

Next, a method of generating an SCMA-RS will be described. An SCMA-RS is generated by performing modulation in SCMA (which may be referred to as "SCMA modulation" below) on a predetermined sequence on the basis of a codebook used in SCMA. For example, FIG. 13 is an explanatory diagram for describing an example of a method of generating a reference signal (SCMA-RS) according to the present embodiment.

Figure 13:
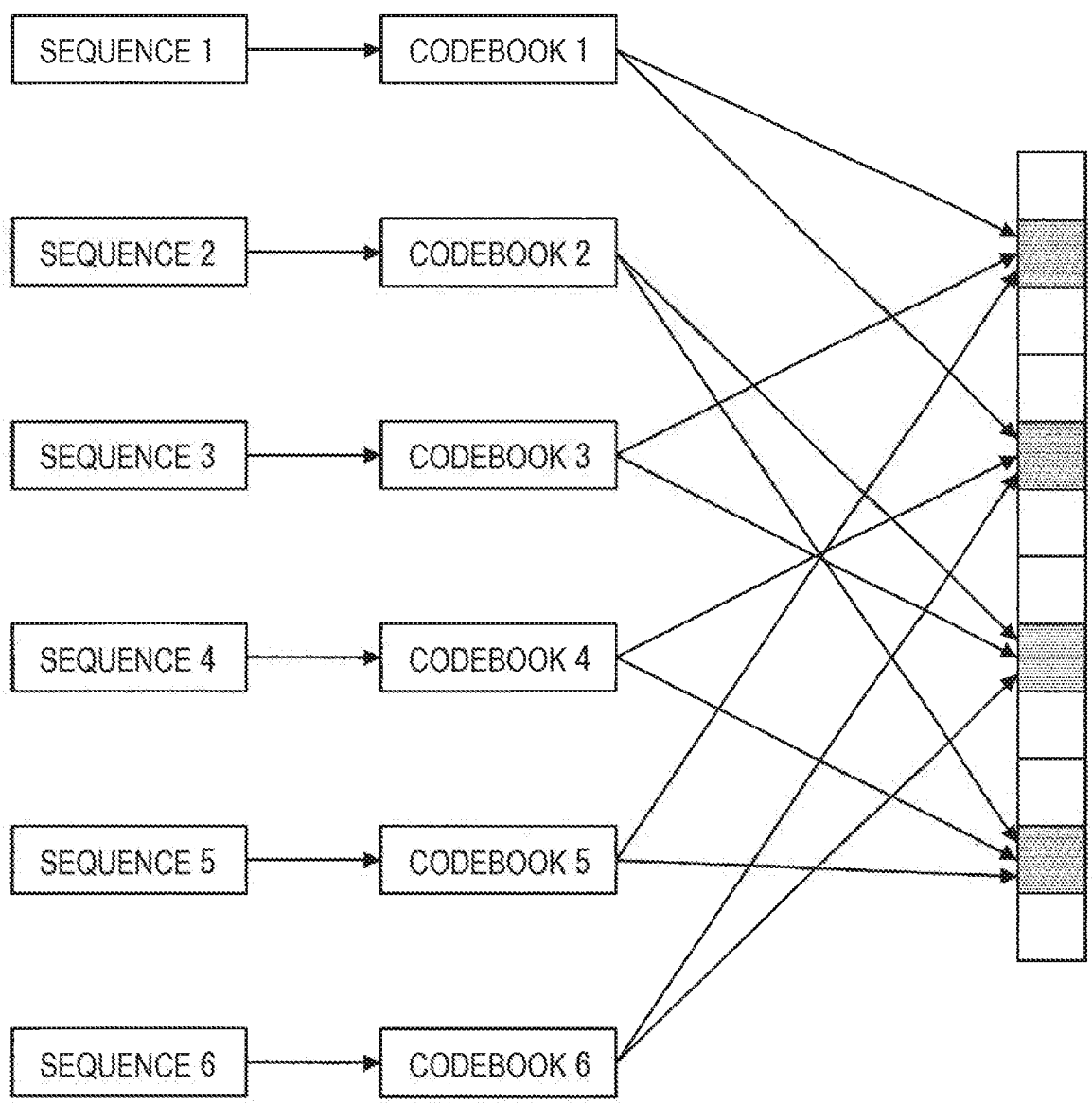
FIG. 13 is an explanatory diagram for describing an example of a method of generating a reference signal according to the embodiment.

In the example illustrated in FIG. 13, existing sequences 1 to 6 are converted into codewords for SCMA using codebooks 1 to 6 included in a codebook group determined in advance. In addition, an SCMA-RS is generated by multiplexing respective signal elements of the codewords (i.e., codewords of respective layers) generated for the codebooks 1 to 6 for each of radio resources allocated to transmit the SCMA-RS.

Figure 14:
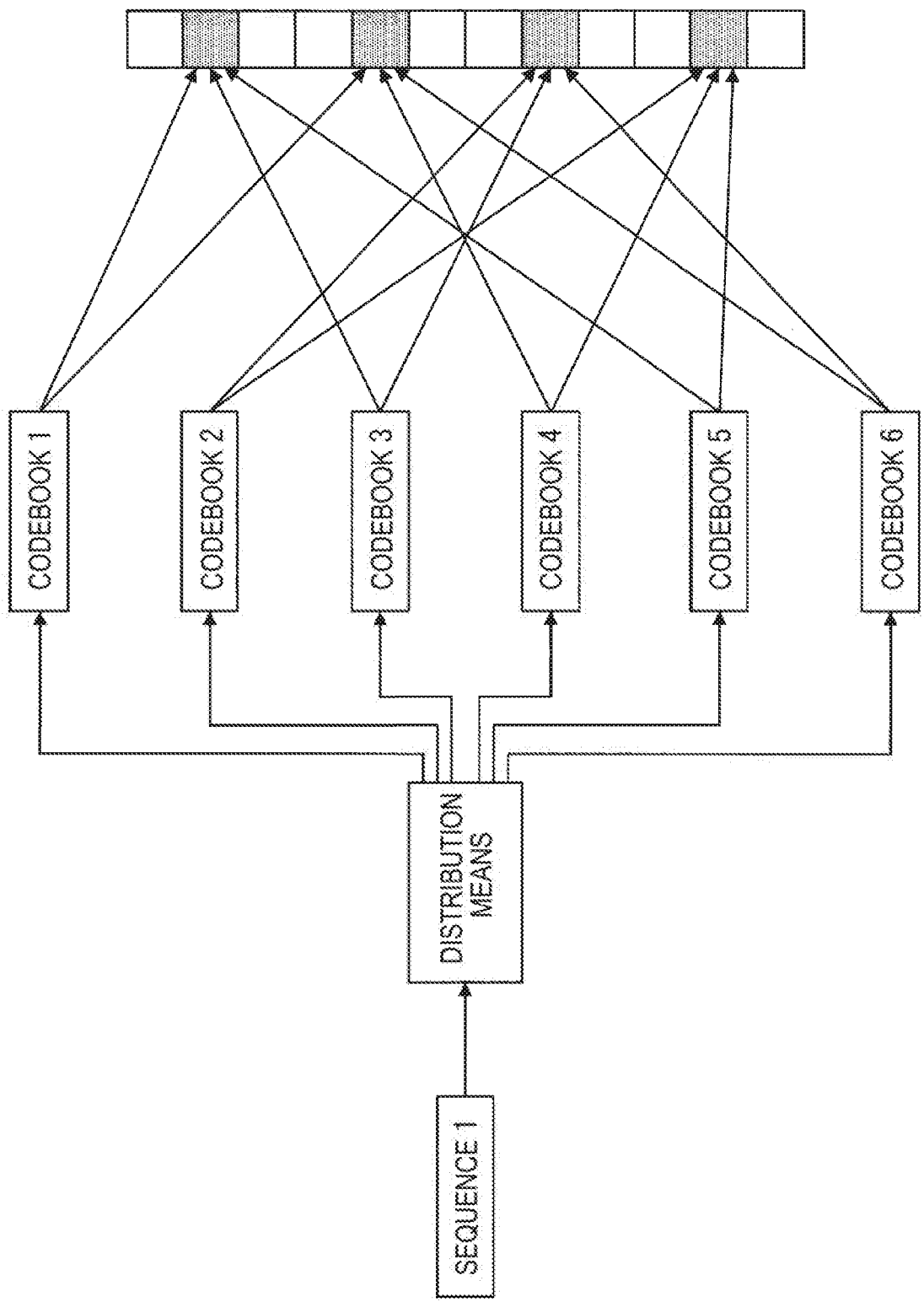
FIG. 14 is an explanatory diagram for describing an example of a method of generating a reference signal according to the embodiment.

In addition, FIG. 14 is an explanatory diagram for describing another example of a method of generating a reference signal (SCMA-RS) according to the present embodiment. In the example illustrated in FIG. 14, a distribution means generates a plurality of sequences by using a predetermined sequence 1. That is, the SCMA-RS is generated in the example illustrated in FIG. 14 by converting 6 sequences that are generated from the existing sequence 1 into codewords using codebooks 1 to 6, and multiplexing respective signal elements of the codewords for each of radio resources.

Note that the methods of generating the SCMA-RSs illustrated in FIGS. 1 and 14 are merely examples, and the generation method is not particularly limited as long as a SCMA-RS is generated by generating codewords from a plurality of sequences and multiplexing respective signal elements of the codewords for each of radio resources. Furthermore, content of sequences used during generation of an SCMA-RS is not particularly limited as long as a process can be executed on a codebook indication based on the SCMA-RS, which will be described below. Note that an example of a sequence to be used during generation of an SCMA-RS will be separately described below.

The SCMA-RS generated for each radio resource is mapped to a corresponding radio resource, transmitted to the terminal device 200, and demodulated by the terminal device 200. For this reason, it is assumed that information of a codebook for modulating the SCMA-RS (i.e., a codebook to be used during the generation of the SCMA-RS) is shared by the base station 100 and the terminal device 200 beforehand. As a specific example of a codebook for demodulating the SCMA-RS, a pre-determined fixed codebook may be used.

In addition, as another example, information of a codebook for demodulating the SCMA-RS (i.e., a codebook that is used fin the generation of the SCMA-RS) may be shared between the base station 100 and the terminal device 200 on the basis of transmission and reception of information between the base station 100 and the terminal device 200. Specifically, the base station 100 may report a codebook for demodulating the SCMA-RS to the terminal device 200 by using control information such as DCI.

Furthermore, data of the above-described SCMA-RS (i.e., a signal mapped to each radio resource) may be, for example, generated for each codebook group in advance and stored in a predetermined storage area. With this configuration, the base station 100 does not need to frequently execute processes relating to the generation of the SCMA-RS at each transmission timing of the SCMA-RS.

Note that, although the examples of the reference signals for giving a codebook indication in a case in which communication is performed on the basis of the codebooks for generating signals of 4-dimensional constellations have been described above, the embodiment is not necessarily limited to thereto. Communication may be performed on the basis of codebooks for generating signals of 6-dimensional constellations, as a specific example. In this case, an SCMA-RS may be generated on the basis of the codebooks for generating the signals of the 6-dimensional constellations.

(c) Codebook Indication (c-1) Operation of Base Station 100

The base station 100 (the communication processing unit 159) transmits, for example, a request for a codebook indication to the terminal device 200. At this time, the base station 100 (the communication processing unit 159) reports a resource block to be used during transmission of an SCMA-RS to the terminal device 200.

Next, the base station 100 (the communication processing unit 159) transmits the SCMA-RS to the terminal device 200 by using the resource block reported to the terminal device 200. Note that details of the process relating to the transmission of the SCMA-RS will be separately described below along with a series of communication processes.

In addition, the base station 100 (the communication processing unit 159) may transmit a plurality of sets of SCMA-RSs to the terminal device 200 by using a plurality of resource blocks having different allocated subframes or frequency bands.

As a specific example, the base station 100 (the communication processing unit 159) may transmit SCMA-RSs to the terminal device 200 for a plurality of codebook groups. In this case, for example, the base station 100 (the communication processing unit 159) may allocate reference signals (SCMA-RSs) generated on the basis of different codebook groups to each resource block.

Figure 15:
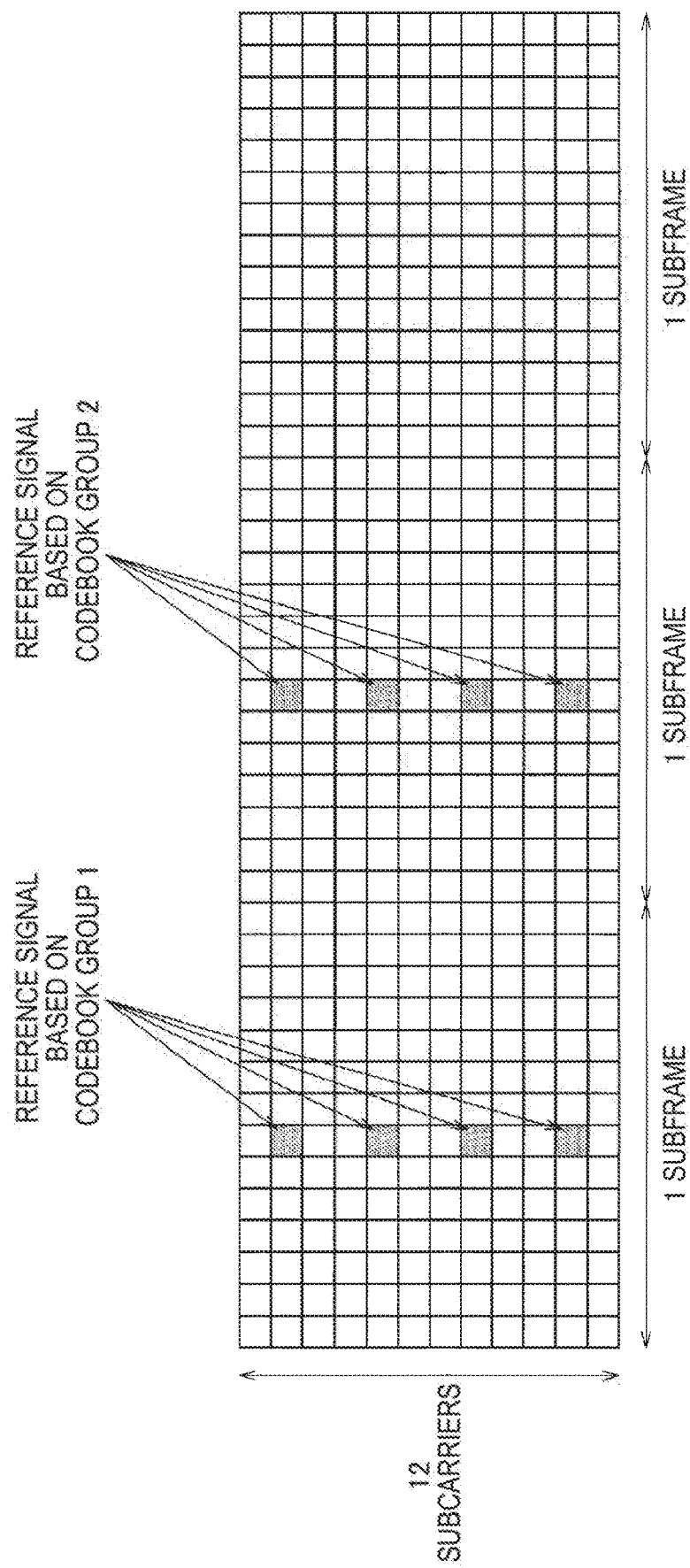
FIG. 15 is an explanatory diagram for describing an example of a method of transmitting reference signals according to the embodiment.

For example, FIG. 15 is an explanatory diagram for describing an example of a method of transmitting reference signals (SCMA-RSs) according to the present embodiment. In the example illustrated in FIG. 15, the base station 100 (the communication processing unit 159) allocates reference signals (SCMA-RSs) generated on the basis of different codebook groups to radio resources of resource blocks that are allocated to different subframes.

Figure 16:
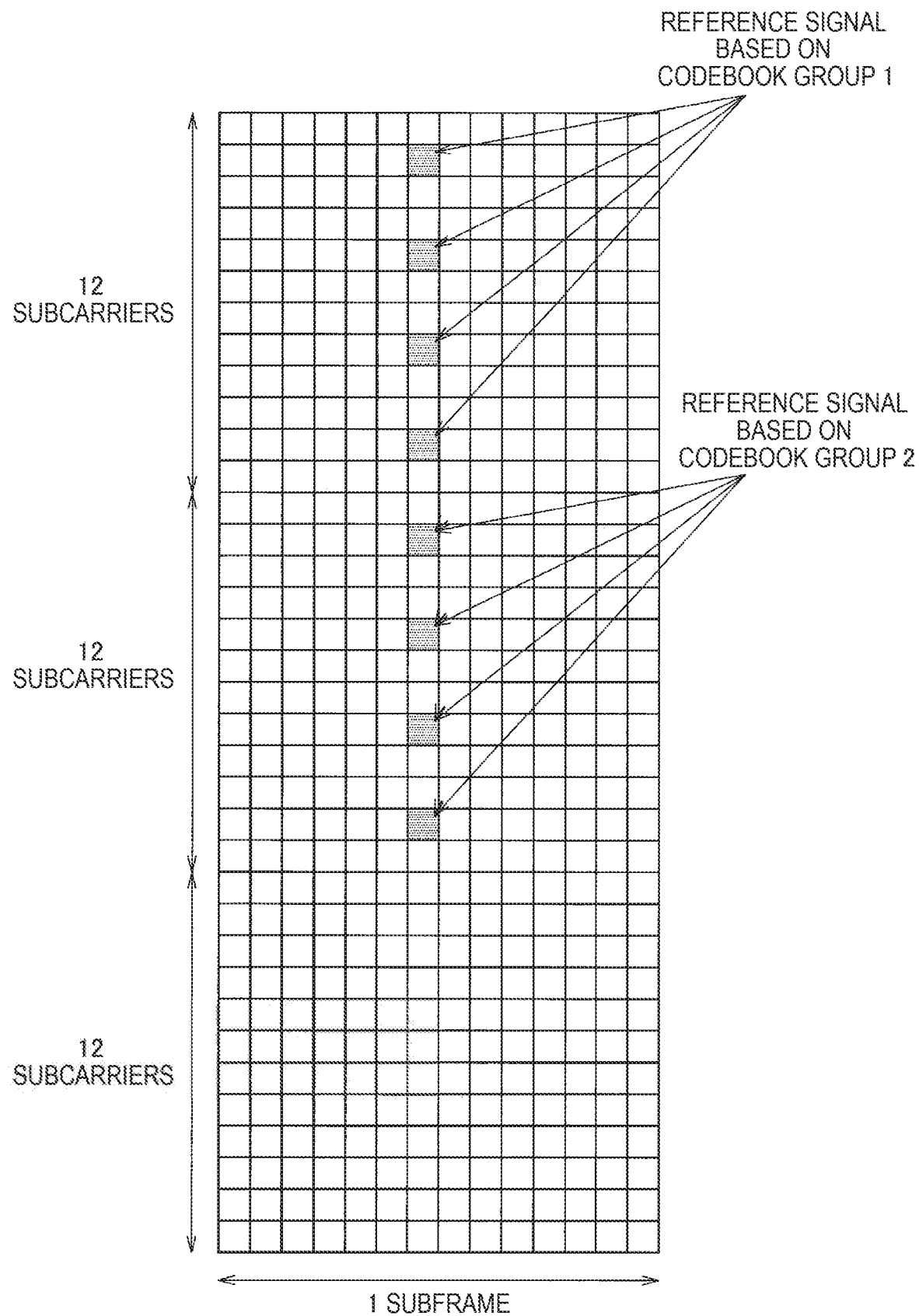
FIG. 16 is an explanatory diagram for describing another example of a method of transmitting reference signals according to the embodiment.

Furthermore, FIG. 16 is an explanatory diagram for describing another example of a method of transmitting reference signals (SCMA-RSs) according to the present embodiment. In the example illustrated in FIG. 16, the base station 100 (the communication processing unit 159) allocates reference signals (SCMA-RSs) generated on the basis of different codebook groups to radio resources of resource blocks that are allocated to different frequency bands.

In addition, as another example, the base station 100 (the communication processing unit 159) may allocate reference signals (SCMA-RSs) generated on the basis of different sequences (e.g., sequences with different initial values) to respective resource blocks.

(c-2) Operation of Terminal Device 200

The terminal device 200 (the communication processing unit 243) receives, for example, a request for a codebook indication from the base station 100. In addition, the terminal device 200 (the communication processing unit 243) may acquire an SCMA-RS transmitted following the request on the basis of the request. In this case, the terminal device 200 (the communication processing unit 243) refers to a resource block reported by the base station 100 on the basis of the request for a codebook indication to receive the SMCA-RS transmitted from the base station 100.

In the case in which the SCMA-RS is received, the terminal device 200 (the communication processing unit 243) separates signals corresponding to respective layers (i.e., signal elements of codewords corresponding to sequences 1 to 6) from the SCMA-RS on the basis of each codebook of a corresponding codebook group.

Note that, in this case, the terminal device 200 (the communication processing unit 243) may separate a signal corresponding to each layer multiplexed for each radio resource (i.e., multiplexed as an SCMA-RS) by using the above-described message passing algorithm.

In addition, in a case in which an existing sequence is used during the generation of the SCMA-RS, the terminal device 200 (the communication processing unit 243) can recognize a signal of each layer multiplexed for each radio resource as the SCMA-RS. Thus, the terminal device 200 (the communication processing unit 243) may generate a duplicate of a signal of each of the layers multiplexed for each of the radio resources (which may be referred to as a "duplicate signal" below) on the basis of the existing sequence and use the duplicate signal during separation of signals corresponding to each of the layers multiplexed for each of the radio resources.

As a specific example, a case in which the terminal device 200 (the communication processing unit 243) demodulates a signal corresponding to Layer 1 from the SCMA-RS in which signals corresponding to Layers 1, 3, and 5 (signal elements of codewords) are multiplexed will be focused on. In this case, the terminal device 200 (the communication processing unit 243) may separate the signal corresponding to Layer 1 by removing components of duplicate signals corresponding to Layers 3 and 5 generated on the basis of an existing sequence from the SCMA-RS.

Likewise, a case in which a signal corresponding to Layer 6 is demodulated from the SCMA-RS in which signals corresponding to Layers 2, 3 and 6 (signal elements of codewords) are multiplexed will be focused on. In this case, the terminal device 200 (the communication processing unit 243) may separate the signal corresponding to Layer 6 by removing components of duplicate signals corresponding to Layers 2 and 3 generated on the basis of an existing sequence from the SCMA-RS.

In the case in which duplicate signals generated on the basis of an existing sequence are used to separate signals of layers multiplexed for each of radio resources, an error propagates less when the signals of the layers are separated than when the message passing algorithm is used. Thus in this case, codewords of each of the layers can be demodulated from the SCMA-RS with higher accuracy. Furthermore, since it is possible to omit a process by using the message passing algorithm, a processing load caused by the demodulation of the codewords of each of the layers can also be reduced.

The terminal device 200 (the communication processing unit 243) separates the signals corresponding to the respective layers from the received SCMA-RS, as described above.

Next, the terminal device 200 (the information acquisition unit 241) acquires information that the base station 100 will refer to in order to select a codebook group by evaluating the separated signals corresponding to the respective layers. Then, the terminal device 200 (the communication processing unit 243) transmits the acquired information to the base station 100 as the codebook indication.

As a specific example, the terminal device 200 (the information acquisition unit 241) may measure a noise ratio (e.g., a signal-to-noise ratio (SNR)) on the basis of the separated signals corresponding to the respective layers. In this case, the terminal device 200 (the communication processing unit 243) may transmit the measurement result of the noise ratio to the base station 100 as the codebook indication.

In addition, as another example, the terminal device 200 (the information acquisition unit 241) may calculate an error rate on the basis of data (a sequence) demodulated from the separated signals corresponding to the respective layers. In this case, the terminal device 200 (the communication processing unit 243) may transmit the calculation result of the error rate to the base station 100 as the codebook indication.

More specifically, the terminal device 200 (the communication processing unit 243) demodulates a codeword corresponding to each of the layers from the separated signals corresponding to the respective layers and converts the demodulated codes into original data (a sequence) on the basis of a codebook corresponding to the layer. Then, the terminal device 200 (the information acquisition unit 241) may calculate an error rate on the basis of the data obtained by converting the codeword.

Further, the terminal device 200 (the information acquisition unit 241) may transmit a designation of a codebook to be used to the base station 100 as the codebook indication.

In this case, the terminal device 200 (the information acquisition unit 241) specifies a more preferable codebook on the basis of, for example, the measurement result of the noise ratio, the calculation result of the error rate, or the like. Then, the terminal device 200 (the communication processing unit 243) may transmit information indicating the specified codebook (e.g., an index value of the codebook) to the base station 100 as the codebook indication.

Further, the terminal device 200 (the information acquisition unit 241) may transmit a designation of a codebook group to the base station 100 as the codebook indication.

In addition, the terminal device 200 (the communication processing unit 243) may acquire SCMA-RSs for a plurality of codebook groups. In this case, the terminal device 200 (the information acquisition unit 241) acquires information that the base station 100 will refer to in order to select a codebook group for each of the acquired SCMA-RSs (i.e., each codebook group). Then, the terminal device 200 (the communication processing unit 243) may transmit a codebook indication based on information acquired for a plurality of codebook groups to the base station 100. As a specific example, the terminal device 200 (the communication processing unit 243) may transmit each piece of the information acquired for the plurality of codebook groups to the base station 100 as the codebook indication.

Note that the examples in which the terminal device 200 transmits the codebook indication to the base station 100 on the basis of the SCMA-RSs transmitted from the base station 100 have been described above. Meanwhile, as long as the terminal device 200 can transmit information that the base station 100 will refer to in order to select a codebook group to the base station 100 as the codebook indication, the above-described operation method is not necessarily limited to the method using an SCMA-RS.

As a specific example, the terminal device 200 may transmit information acquired by evaluating existing reference signals, such as a CRS, a CSI-RS, and DM-RS, to the base station 100 as the codebook indication. The information transmitted by the terminal device 200 to the base station 100 as the codebook indication may certainly not be information based on a signal transmitted from the base station 100 (e.g., the reference signal).

(d) Selection and Reporting of Codebook Group

The base station 100 (the communication processing unit 159) receives the codebook indication from the terminal device 200, for example, after the transmission of the request for the codebook indication to the terminal device 200 (or after the transmission of the reference signal). At this time, the base station 100 (the communication processing unit 159) may receive a codebook indication for a plurality of codebook groups from the terminal device 200.

The base station 100 (the selection unit 153) selects a more preferable codebook group by using the received codebook indication as reference information.

As a specific example, the base station 100 (the selection unit 153) may select a more preferable codebook group on the basis of reception quality of a signal (e.g., a noise ratio or an error rate) reported by the terminal device 200 as the codebook indication.

In addition, as another example, the base station 100 (the selection unit 153) may receive designation of a codebook or a codebook group from the terminal device 200 as the codebook indication. In this case, for example, the base station 100 (the selection unit 153) may select a more preferable codebook group with reference to the designation of the codebook or the codebook group from each of the terminal devices 200.

Then, the base station 100 (the reporting unit 157) reports the selected codebook group (i.e., a codebook group selected from the plurality of codebook groups) to the terminal device 200.

More specifically, for example, the base station 100 (the reporting unit 157) reports the codebook group included in DCI to the terminal device 200. For example, the base station 100 (the reporting unit 157) generates DCI including information indicating the codebook group. The information indicating the codebook group may be identification information of the codebook group (e.g., a group number of the codebook group).

Accordingly, the terminal device 200 can ascertain, for example, the codebook group to be used.

(e) Operation of Terminal Device

For example, the terminal device 200 (the communication processing unit 243) separates the codewords corresponding to respective layers on the basis of the codebook group corresponding to each of the layers reported from the base station 100 among the plurality of codebook groups and demodulates reception data from the codewords. Note that details of the operation relating to the demodulation the reception data by the terminal device 200 (the communication processing unit 243) will be separately described below along with a series of flows of a reception process.

(f) Example of Method of Generating Reference Signal

The example in which the existing sequence is used during the generation of the SCMA-RS has been described above. Meanwhile, content of data to be used as the sequence is not particularly limited as long as the terminal device 200 can execute a pre-decided evaluation on the signals corresponding to the respective layers separated from the SCMA-RS. Therefore, an example of a sequence to be used during the generation of the SCMA-RS will be described in this section.

As a specific example, the sequence to be used during the generation of the SCMA-RS may not necessarily be an existing sequence on the terminal device 200 side. For example, the SCMA-RS may be generated on the basis of an unknown sequence in a case in which the terminal device 200 the information acquisition unit 241) only performs evaluation that does not depend on data that is a generation source of the signals, such as an evaluation of a noise ratio, as an evaluation with respect to the signals corresponding to the respective layers separated from the SCMA-RS.

In addition, the SCMA-RS may be generated on the basis of an existing sequence of which a generation algorithm is known, for example, an M sequence or Gold sequence. In addition, sequences converted into codewords by using each codebook included in a codebook group may be difference sequences, as illustrated in FIG. 13, or the same sequence may be used in at least some of the codewords.

Further, pseudo random codes may be generated as the sequence by adding predetermined information to the existing sequence as an initial value of the sequence for generating the SCMA-RS.

As a specific example, identification information (e.g., an index value) for identifying each codebook included in the codebook group may be used as the initial value of the sequence. In addition, the identification information (e.g., an index value) for identifying the codebook group may be used as the initial value of the sequence.

In addition, as another example, a value determined in accordance with a time, such as a slot number, may be used as the initial value of the sequence. Pseudo random codes may be generated as the sequence by using a value that actively changes in accordance with a situation as the initial value of the sequence, as described above.

By generating pseudo random codes as the sequence, as described above, for example, accuracy in evaluation of a codebook indication by the terminal device 200 can also be improved.

As a specific example, the terminal device 200 may perform measurement of noise ratios on a plurality of sets of SCMA-RSs on the basis of sequences generated using different initial values, and transmit an average value of the measurement results to the base station 100 as the codebook indication. Since the SCMA-RSs used in the measurement of the noise ratios appropriately change in accordance with the sequences that are generation sources thereof in this configuration, the noise ratios can be measured more accurately.

(2) Allocation
(a) Allocation of Resources

The base station 100 (the allocation unit 151) allocates, for example, radio resources to the terminal device 200.

The radio resources are, for example, radio resources to be used in transmission of codewords. More specifically, the radio resources are, for example, blocks corresponding to lengths of codewords. This point will be described below exemplifying the blocks with reference to FIG. 17.

Figure 17:
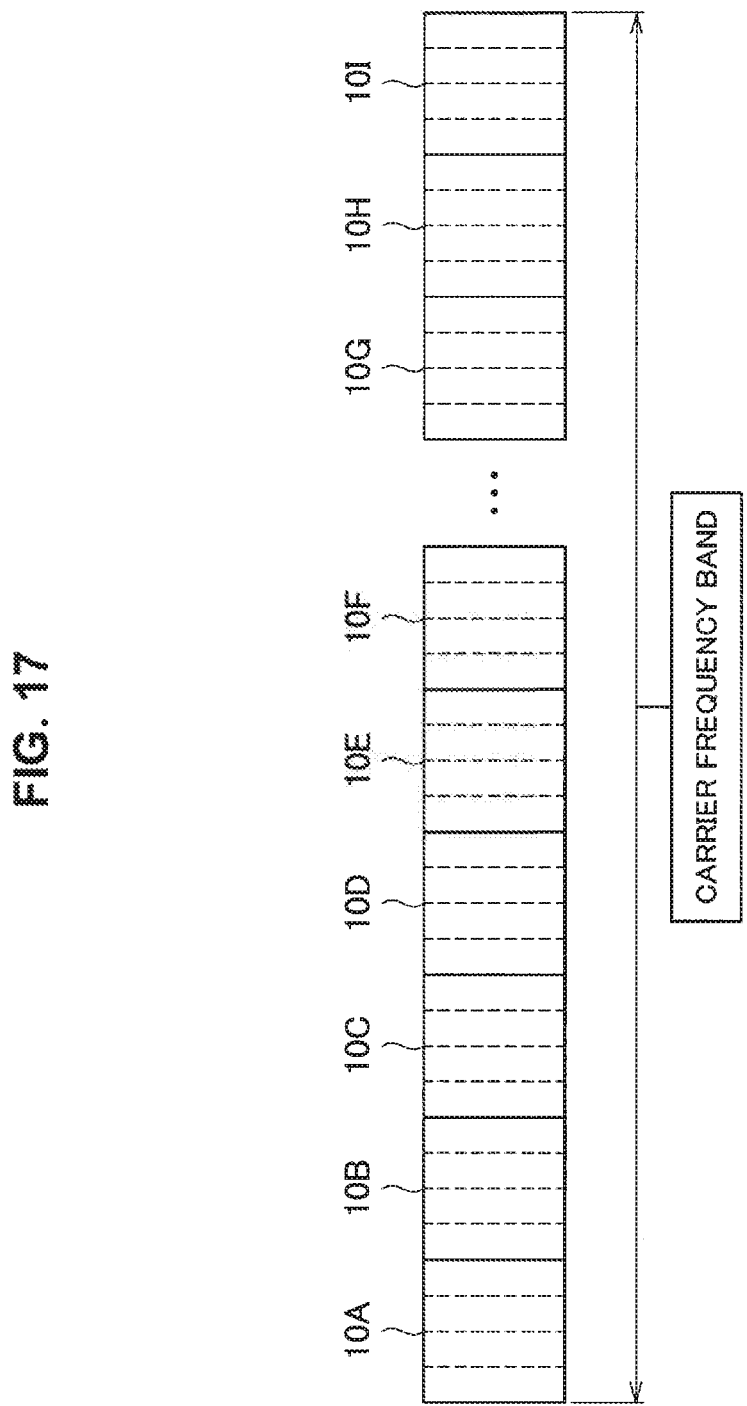
FIG. 17 is an explanatory diagram for describing an example of blocks which are radio resources to be used in transmission of codewords.

FIG. 17 is an explanatory diagram for describing an example of the blocks which are radio resources to be used in transmission of codewords. Referring to FIG. 17, a carrier frequency band is shown. The carrier frequency band includes a plurality of blocks 10 (e.g., blocks 10A to 10I, etc.). A length of a codeword (i.e., the number of signal elements included in a codeword) is, for example, 4, and each block 10 includes 4 subcarriers in the frequency direction. As an example, the subcarriers are deployed at an interval of 12 kHz. The blocks 10 also include predetermined periods in a time direction. The predetermined periods are, for example, symbols, slots, subframes, or radio frames. The blocks 10 may be resource blocks that are units of allocation of radio resources, or may be sub-resource blocks that are a part of the resource blocks. The base station 100 (the allocation unit 151) allocates one or more blocks 10 to the terminal device 200. In addition, the base station 100 (the allocation unit 151) allocates the same block 10 to two or more terminal devices 200. The base station 100 (the allocation unit 151) allocates, for example, the same block 10 to the terminal devices 200A to 200F.

Although the example in which the blocks to be used in transmission of codewords are contiguous in the frequency direction has been described, the blocks are not limited thereto. The blocks may be, for example, non-contiguous in the frequency direction. That is, the blocks may include two or more discrete subcarriers in the frequency direction.

In addition, although the example in which a length of a codeword (and the number of subcarriers included in a block) is 4 has been described, the length (and the number) is not limited thereto. A length of a codeword (and the number of subcarriers included in a block) may be, for example, another length (and another number). The length (and the number) may be, for example, 6 or 12.

(b) Allocation of Layers

The base station 100 (the allocation unit 151) allocates, for example, each of a plurality of layers that are subject to non-orthogonal multiplexing using a codebook to the terminal device 200.

(b-1) Non-Orthogonal Multiplexing Using Codebook

As described above, the codebook is, for example, a codebook of sparse codes (SCs), and the non-orthogonal multiplexing using the codebook is multiplexing in SCMA.

(b-2) Plurality of Layers

The plurality of layers is, for example, layers of SCMA.

The number of layers of the plurality of layers is, for example, equal to or smaller than an acceptable maximum number. As an example, the acceptable maximum number is 6. That is, the base station 100 (the allocation unit 151) allocates each of 6 or fewer layers to the terminal device 200.

The base station 100 (the allocation unit 151) allocates, for example, each of 6 layers (Layer 1 to Layer 6) to the terminal device 200. The base station 100 (the allocation unit 151) allocates, for example, each of 5 layers (5 out of Layer 1 to Layer 6) to the terminal device 200.

Note that, as a length of a codeword (and the number of subcarriers to be used in transmission of a codeword) become greater, the acceptable maximum number increases, which, however, makes design of a code oak more difficult and increases a load of a reception process.

(b-3) Example of Allocation of Layers

The base station 100 (the allocation unit 151) allocates, for example, each of the plurality of layers to different terminal devices 200. As an example, the base station 100 (the allocation unit 151) allocates Layer 1 to the terminal device 200A, Layer 2 to the terminal device 200B, Layer 3 to the terminal device 200C, Layer 4 to the terminal device 200D, Layer 5 to the terminal device 200E, and Layer 6 to the terminal device 200F. Accordingly, for example, more terminal devices 200 can communicate at the same time.

Note that the base station 100 (the allocation unit 151) may allocate 2 or more layers to the same terminal device 200. As an example, the base station 100 (the allocation unit 151) may allocate Layer 1 and Layer 2 to the terminal device 200A. Accordingly, for example, a communication speed of the terminal device 200A can improve.

(3) Reporting of Layer

The base station 100 (the information acquisition unit 155) acquires information indicating a layer to be allocated to the terminal device 200 among the plurality of layers (i.e., a plurality of layers that are subject to non-orthogonal multiplexing using a codebook). Then, the base station 100 (the reporting unit 157) reports the layer to the terminal device 200.

Accordingly, for example, the terminal device 200 can ascertain the layer allocated to the terminal device 200 when non-orthogonal multiplexing using a codebook is used.

(a) Reporting with DCI

The base station 100 (the reporting unit 157) reports, for example, the layer included in downlink control information (DCI) to the terminal device 200. The DCI is, for example, information transmitted on a physical downlink control channel (PDCCH).

The base station 100 (the reporting unit 157) reports, for example, Layer 1 allocated to the terminal device 200A to the terminal device 200A using DCI destined for the terminal device 200A. The base station 100 (the reporting unit 157) reports, for example, Layer 4 allocated to the terminal device 200D to the terminal device 200D using DCI destined for the terminal device 200D.

Accordingly, for example, dynamic allocation of layers (e.g., allocation of layers of each subframe) is possible. Thus, even when non-orthogonal multiplexing using a codebook is used, for example, the terminal device 200 can flexibly perform a DRX operation and/or semi-persistent communication.

(b) Specific Operation

The base station 100 (the reporting unit 157) generates, for example, DCI including information indicating the layer. The information indicating the layer may be a layer number of the layer.

The base station 100 (the communication processing unit 159) generates a CRC on the basis of, for example, an ID of the terminal device 200 (e.g., RNTI: radio network temporary ID), and adds the CRC to the DCI. Then the base station 100 (the communication processing unit 159) performs encoding, rate matching, and multiplexing on the DCI to which the CRC has been added.

Meanwhile, the terminal device 200 monitors the PDCCH of each subframe on the basis of, for example, the ID (e.g., RNTI) of the terminal device 200 and finds out DCI destined for the terminal device 200. Then, the terminal device 200

(the information acquisition unit 241) acquires the DCI and acquires the information indicating the layer included in the DCI.

(c) Reporting of Other Information

The base station 100 (the reporting unit 157) reports, for example, a radio resource to be used in transmission of a codeword of the layer included in the DCI to the terminal device 200. Accordingly, the terminal device 200 can ascertain the radio resource of the layer allocated to the terminal device 200.

Furthermore, the base station 100 (the reporting unit 157) may report, for example, other information suitable for a transmission mode included in the DCI to the terminal device 200. The other information may include a modulation and coding scheme (MCS), a new data indicator (NDI), a power control command of a physical uplink control channel (PUCCH), and/or precoding information.

(4) Communication Processes

The base station 100 (the communication processing unit 159) performs, for example, a communication process for the plurality of layers (i.e., a plurality of layers that are subject to non-orthogonal multiplexing using a codebook).

The terminal device 200 (the information acquisition unit 241) acquires, for example, information indicating a layer allocated to the terminal device 200 among the plurality of layers. Then, the terminal device 200 (the communication procession unit 243) performs a communication process for the layer on the basis of the information indicating the layer.

(a) Downlink Case

The non-orthogonal multiplexing is performed in, for example, downlink. In this case, the base station 100 (the communication processing unit 159) performs a transmission process for the plurality of layers. Meanwhile, the terminal device 200 (the communication processing unit 243) performs a reception process for the layer allocated to the terminal device 200 among the plurality of layers.

(a-1) Transmission Process of Base Station 100

—Generation of Codeword

The transmission process includes, for example, generation of a codeword of a layer from data of the layer for each of the plurality of layers. For example, the base station 100 (the communication processing unit 159) generates a codeword of a layer from data of the layer for each of the plurality of layers on the basis of a codebook for the layer.

The base station 100 (the communication processing unit 159) generates, for example, a codeword of Layer 1 from data of Layer 1 on the basis of a codebook (e.g., Codebook 1 illustrated in FIG. 3) for Layer 1. Further, as another example, the base station 100 (the communication processing unit 159) generates a codeword of Layer 4 from data of Layer 4 on the basis of a codebook (e.g., Codebook 4 illustrated in FIG. 3) for Layer 4.

Note that the codebooks used during generation of codewords may be, for example, codebooks included in a codebook group selected on the basis of a codebook indication from each of the terminal devices 200.

—Mapping of Codewords to Radio Resources

The transmission process includes, for example, mapping of the codewords to radio resources to be used in transmission of the codewords for each of the plurality of layers.

The base station 100 (the communication processing unit 159) maps, for example, the codewords to the same block for each of the plurality of layers. More specifically, for example, the base station 100 (the communication processing unit 159) maps each signal element included in the codeword of each layer to a corresponding radio resource (e.g., a resource element) within the block.

At this time, the base station 100 (the communication processing unit 159) performs multiplexing by mapping the codewords of the plurality of layers to the same block. Note that, although signal elements of codewords of different layers are mapped to the same resource element, the signal elements may be mapped to the same resource element after the signal elements are added, or may be added after the signal elements are mapped to the same resource element.

In addition the base station 100 (the communication processing unit 159) maps various reference signals to a predetermined resource element. Note that a reference signal for frequency synchronization, for example, a CRS, is exemplified as an example of the reference signal.

Further, the base station 100 (the communication processing unit 159) may map a reference signal (SCMA-RS) to be used during the above-described channel evaluation of SCMA according to the present embodiment to a radio resource allocated to the reference signal. Accordingly, the base station 100 (the communication processing unit 159) can receive a codebook indication based on the SCMA-RS from the terminal device 200 and select a more preferable codebook group on the basis of the codebook indication. Note that the codebook group selected at this time is used during modulation of data in SCMA in a case in which the data is transmitted to the terminal device 200 after the reception of the codebook indication.

Example of Overall Transmission Process

First Example

Figure 18:
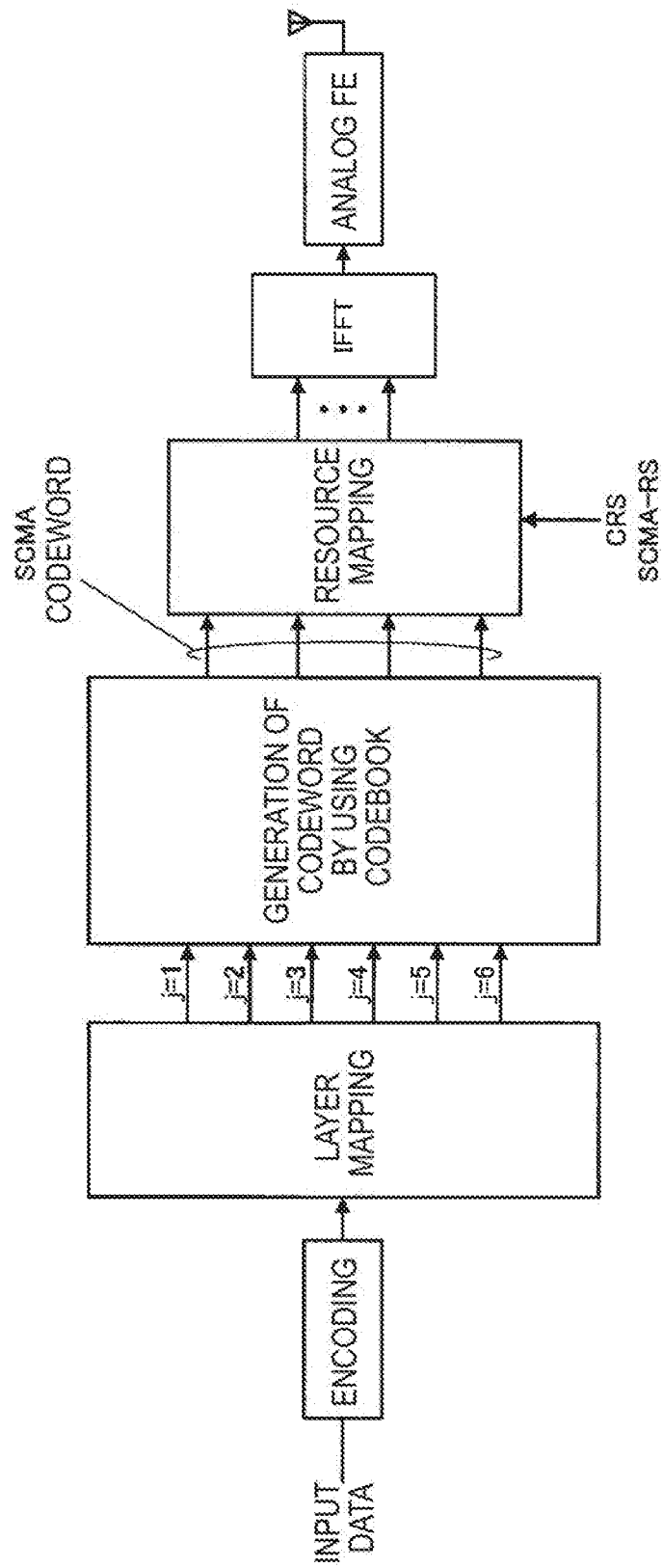
FIG. 18 is an explanatory diagram for describing a first example of an overall transmission process of a base station.

FIG. 18 is an explanatory diagram for describing a first example of an overall transmission process of the base station 100. The transmission process of the base station 100 includes, for example, encoding, layer mapping, generation of codewords based on codewords, resource mapping, an inverse fast Fourier transform (IFFT), and the like.

Figure 19:
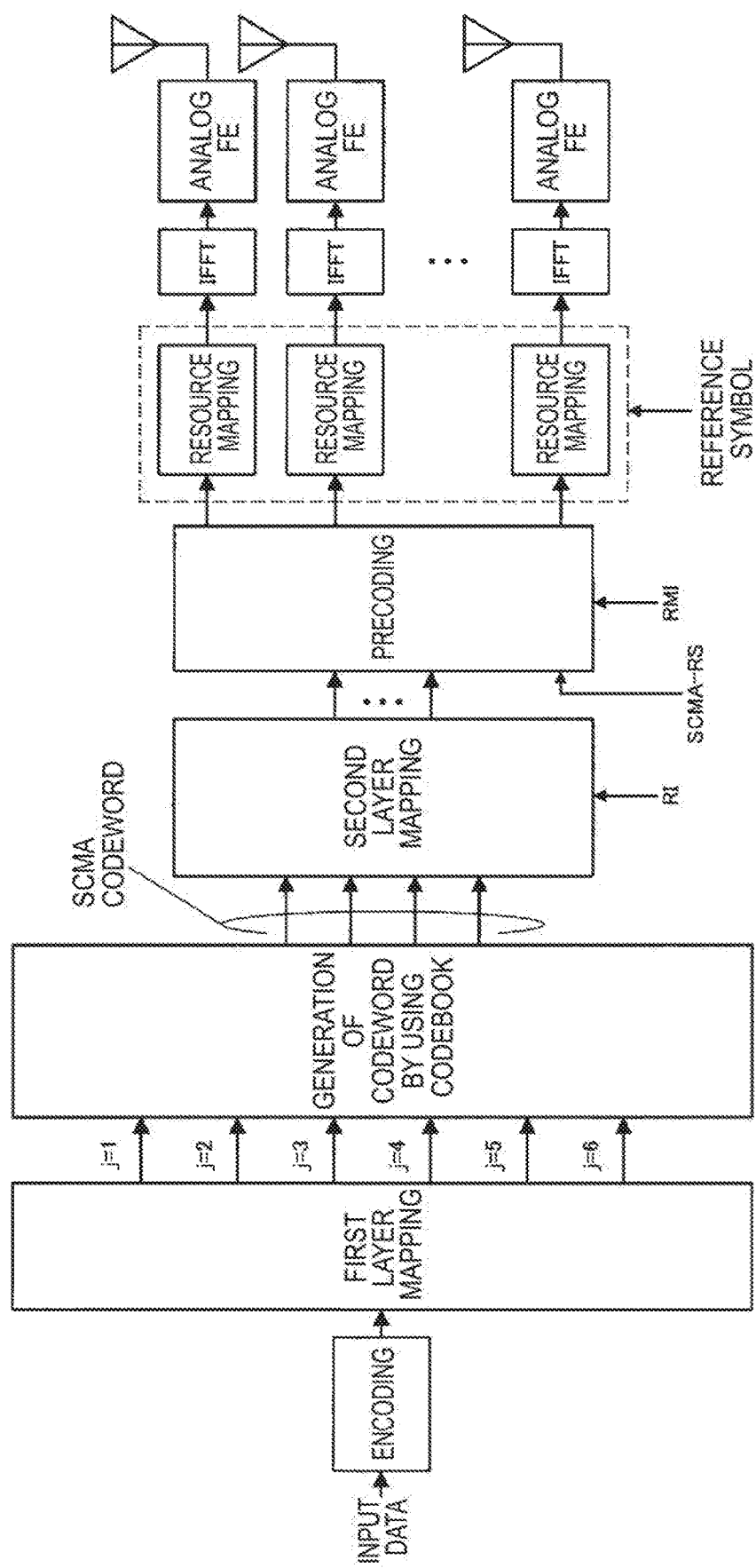
FIG. 19 is an explanatory diagram for describing a second example of an overall transmission process of a base station.

FIG. 19 is an explanatory diagram for describing a second example of an overall transmission process of a base station 100. The second example is a case example of Multiple-Input and Multiple-Output (MIMO). Note that, in present description, a case in which beamforming by a precoder is accompanied with spatial multiplexing will be described as a case example of MIMO.

As illustrated in FIG. 19, the transmission process of the base station 100 in this case includes second layer mapping for spatial multiplexing in addition to first layer mapping for non-orthogonal multiplexing using a codebook. Furthermore, the transmission process includes precoding for spatial multiplexing.

Codewords are, for example, mapped to transmission layers in the second layer mapping, weighted for each antenna in the precoding, and then transmitted. Note that the number of transmission layers is decided on with reference to, for example, a rank indicator (RI) reported by the terminal device 200 to the base station 100. In addition, a set of weights of the precoding is selected among predetermined set groups, for example, such that a total throughput of layers has a maximum value. The set of weights of the precoding is decided on with reference to, for example, a precoding matrix indicator (PMI) reported by the terminal device 200 to the base station 100.

In addition, the above-described SCMA-RS may be weighted for each antenna in the precoding and transmitted like the codewords. In this case, the SCMA-RS is given directionality like the codewords.

Note that the case of MIMO accompanied by beamforming by a precoder has been described above, the so-called open-loop MIMO that is not accompanied by beamforming by a precoder can be realized in SCMA, as described above.

(a-2) Reception Process of Terminal Device 200

—Demapping of Reception Signal from Radio Resources

The reception process includes, for example, demapping the reception signal from the radio resources allocated to the terminal device 200.

The terminal device 200 (the communication processing unit 243) demaps, for example, the reception signal in which signal elements of codewords of different layers are multiplexed from the radio resources used during the transmission of the codewords.

In addition, the terminal device 200 (the communication processing unit 243) demaps various reference signals from the radio resources used during the transmission of the reference signals. Accordingly, an existing reference signal, such as the reference signal (CRS) for frequency synchronization, the reference signal (SCMA-RS) used in channel evaluation of SCMA, and the like, is demapped.

—Demodulation of SCMA-Modulated Data

The reception process includes, for example, demodulating data of each SCMA-modulated layer through SIC. For example, the terminal device 200 (the communication processing unit 243) demodulates the data of a layer on the basis of a codebook for the layer.

The terminal device 200 (the communication processing unit 243) separates, fin example, data of a desired layer (i.e., signal elements of codewords) among the layers from the reception signal for the radio resources allocated to the terminal device 200 on the basis of the codebook for the layer. Specifically, in a case in which data of Layer 1 is separated from the reception signal, the terminal device 200 (the communication processing unit 243) cancels a signal (interference) of another layer other than Layer 1 through SIC, and thereby separates the data of Layer 1. Note that the terminal device 200 separates the data of Layer 1 through SIC on the basis of the codebook for Layer 1 as well as a codebook for the other layer in order to cancel the signal of the other layer.

The terminal device 200 (the communication processing unit 243) demodulates codewords of a layer from the data separated from the reception signal for the radio resources for each layer (i.e., the signal elements of the codewords). Then, the terminal device 200 (the communication processing unit 243) decodes data of each of the layers from the demodulated codewords of the layer on the basis of the codebook for the layer.

As described above, the terminal device 200 (the communication processing unit 243) decodes the data of the layer allocated to the device.

—Demodulation of SCMA-RS

In addition, the reception process includes demodulation of data sequence corresponding to each layer) used in the channel evaluation of SCMA by decoding the SCMA-RS through SIC.

For example, the terminal device 200 (the communication processing unit 243) may demodulate the SCMA-RS through SIC like in the case which the SCMA-modulated data is demodulated as described above.

Further, in a case in which an existing sequence is used during the generation of the SCMA-RS, the terminal device 200 (the communication processing unit 243) may generate a duplicate signal on the basis of the existing sequence and use the duplicate signal during demodulation of a sequence corresponding to each layer. Note that a method of demodulating the SCMA-RS by using a duplicate signal generated on the basis of an existing sequence has been described above.

Example of Overall Reception Process

First Example

Figure 20:
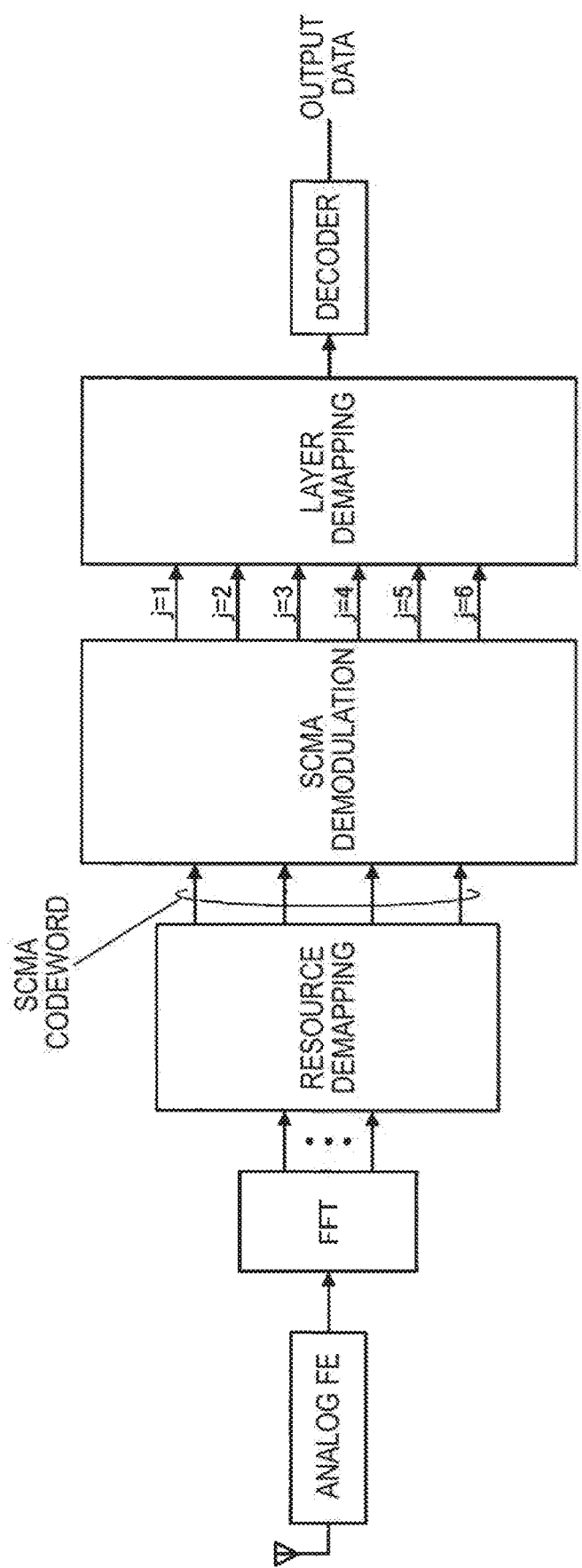
FIG. 20 is an explanatory diagram for describing a first example of an overall reception process of a terminal device.

FIG. 20 is an explanatory diagram for describing a first example of an overall reception process of the terminal device 200. The reception process of the terminal device 200 includes, for example, performing a Fast Fourier Transform (FFT), resource demapping, SCMA demodulating, layer mapping, and decoding.

Second Example

Figure 21:
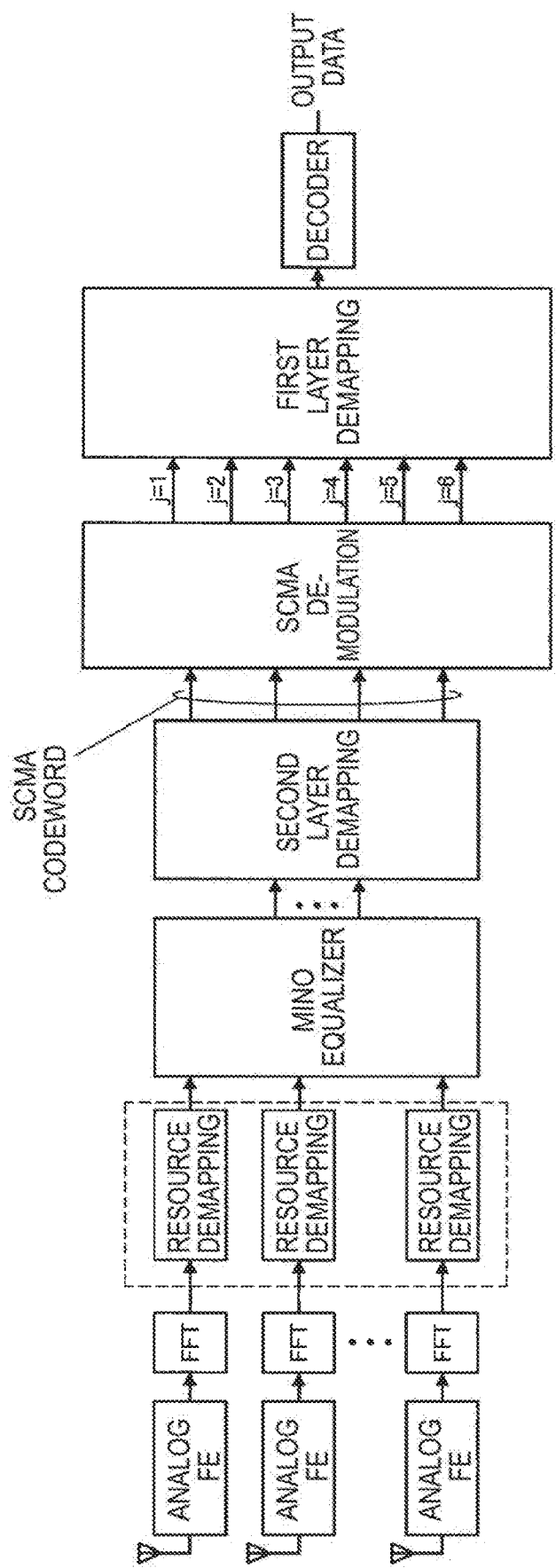
FIG. 21 is an explanatory diagram for describing a second example of an overall reception process of a terminal device.

FIG. 21 is an explanatory diagram for describing a second example of an overall reception process of the terminal device 200. The second example is a case example of MIMO. The reception process of the terminal device 200 includes first layer demapping for taking data of each layer from a decoding result of SCMA-modulated data and second layer demapping for receiving each of spatially multiplexed signals in the example illustrated in FIG. 21.

Specifically, the terminal device 200 (the communication processing unit 243) demaps partially multiplexed signals from radio resources allocated to the terminal device 200 by performing a demapping process on signals received via a plurality of antennas.

In addition, the terminal device 200 (the communication processing unit 243) demaps various reference signals from radio resources used during the transmission of the reference signals by performing the demapping process on the signals received by the each of the antennas. Accordingly, the existing reference signals, for example, the CRS, CSI-RS, DM-RS, and the like, are demapped.

The terminal device 200 (the communication processing unit 243) estimates a spatial channel matrix H on the basis of the demapped reference signals and calculates a reception weight matrix W on the basis of an MMSE algorithm from, for example, the estimated channel matrix H.

The terminal device 200 (the communication processing unit 243) takes a reception signal in which signal elements of codewords of different layers are multiplexed and which is transmitted by radio resources used during the transmission of the codewords from the spatially multiplexed reception signals on the basis of the calculated reception weight matrix W.

Then, the terminal device 200 (the communication processing unit 243) demodulates data of each layer from the taken reception signal on the basis of a codebook for the layer.

Furthermore, the terminal device 200 (the communication processing unit 243) takes a spatially multiplexed SCMA-RS on the basis of the calculated reception weight matrix W like the data of each layer. Then, the terminal device 200 (the communication processing unit 243) demodulates data (i.e., a sequence corresponding to each layer) used during channel evaluation of SCMA by decoding the SCMA-RS on the basis of the codebook of each layer.

(b) Uplink Case

The non-orthogonal multiplexing may be performed in uplink. In this case, the terminal device 200 (the communication processing unit 243) may perform a transmission process or the layer allocated to the terminal device 200 among the plurality of layers. Meanwhile, the base station 100 (the communication processing unit 159) may perform a reception process for the plurality of layers.

(b-1) Transmission Process of Terminal Device 200

—Generation of Codeword

The transmission process may include generation of a codeword of the layer allocated to the terminal device 200 from data of the layer. The terminal device 200 (the communication processing unit 243) may generate a codeword of the layer from the data of the layer on the basis of a codebook for the layer.

Layer 1, for example, may be allocated to the terminal device 200A, and the terminal device 200A (the communication processing unit 243) may generate a codeword of Layer 1 from data of Layer 1 on the basis of codebook 1 illustrated in FIG. 3 to codebook for Layer 1).

—Mapping of Codewords to Radio Resources

The transmission process may include, for example, mapping of the codeword of the layer to a radio resource to be used in transmission of the codeword of the layer allocated to the terminal device 200 (i.e., a radio resource allocated to the terminal device 200).

(b-2) Reception Process of Base Station 100

The reception process may include sequential decoding of data of each of the plurality of layers through SIC. The base station 100 (the communication processing unit 159) may sequentially decode the data of each of the plurality of layers on the basis of codebooks of the plurality of layers.

Layers 1 to 6 may be allocated to, for example, the terminal devices 200A to 200F, and the base station 100 (the communication processing unit 159) may sequentially decode data of each of Layers 1 to 6 through SIC.

5. Process Flow

Figure 22:
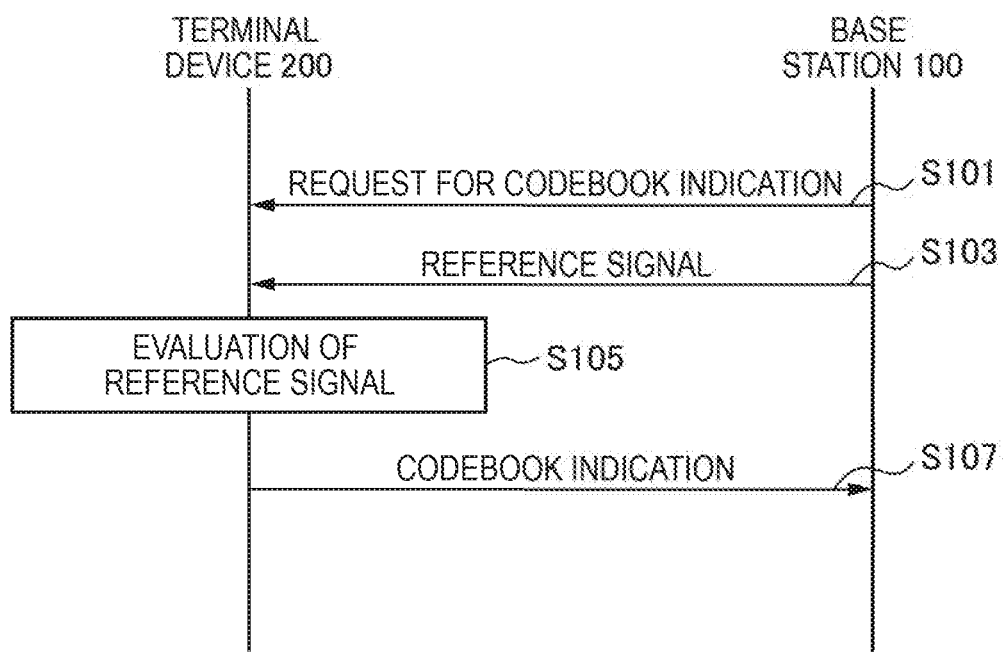
FIG. 22 is a sequence diagram illustrating an example of a schematic flow of a process according to the embodiment.

Next, an example of a process according to an embodiment of the present disclosure will be described with reference to FIG. 22. Note that a process relating to a codebook indication will be focused on in the present description. For example, FIG. 22 is a sequence diagram illustrating an example of a schematic flow of a process according to the embodiment of the present disclosure. The example illustrated in FIG. 22 shows an example of a process relating to a codebook indication using an SCMA-RS.

(Step S101)

The base station 100 requests an indication (i.e., a codebook indication) for selecting a codebook group from the terminal device 200. At this time, the base station 100 reports a resource block to be used during transmission of an SCMA-RS to the terminal device 200.

(Step S103)

Next, the base station 100 transmits a reference signal (i.e., an SCMA-RS) for the codebook indication to the terminal device 200 to the terminal device 200. Note that, at this time, the base station 100 may transmit a plurality of sets of SCMA-RSs to the terminal device 200 by using allocated subframes or a plurality of resource blocks of different frequency bands.

(Step S105)

Upon receiving the request for the codebook indication from the base station 100, the terminal device 200 acquires the SCMA-RS successively transmitted on the basis of the request. Specifically, the terminal device 200 refers to the resource block reported by the base station 100 on the basis of the request for the codebook indication and takes the SMCA-RS transmitted from the base station 100.

Then, the terminal device 200 separates a signal corresponding to each layer from the taken SCMA-RS on the basis of each codebook of a corresponding codebook group.

Next, the terminal device 200 acquires information that the base station 100 will refer to in order to select codebook group by evaluating the separated signal corresponding to the layer.

As a specific example, the terminal device 200 may measure a noise ratio (e.g., a signal-to-noise ratio (SNR)) on the basis of the separated signal corresponding to the layer. In addition, as another example, the terminal device 200 may calculate an error rate on the basis of data (a sequence) demodulated from the separated signal corresponding to the layer. In addition, as still another example, the terminal device 200 may specify a more preferable codebook on the basis of the measurement result of the noise ratio, the calculation result of the error rate, or the like.

(Step S107)

Then, the terminal device 200 transmits the acquired information to the base station 100 as a codebook indication. Accordingly, the base station 100 can select a more preferable codebook group by using the information of the codebook indication received from the terminal device 200 as reference information.

6. Application Examples

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

6.1. Application Examples with Regard to Base Station

First Application Example

Figure 23:
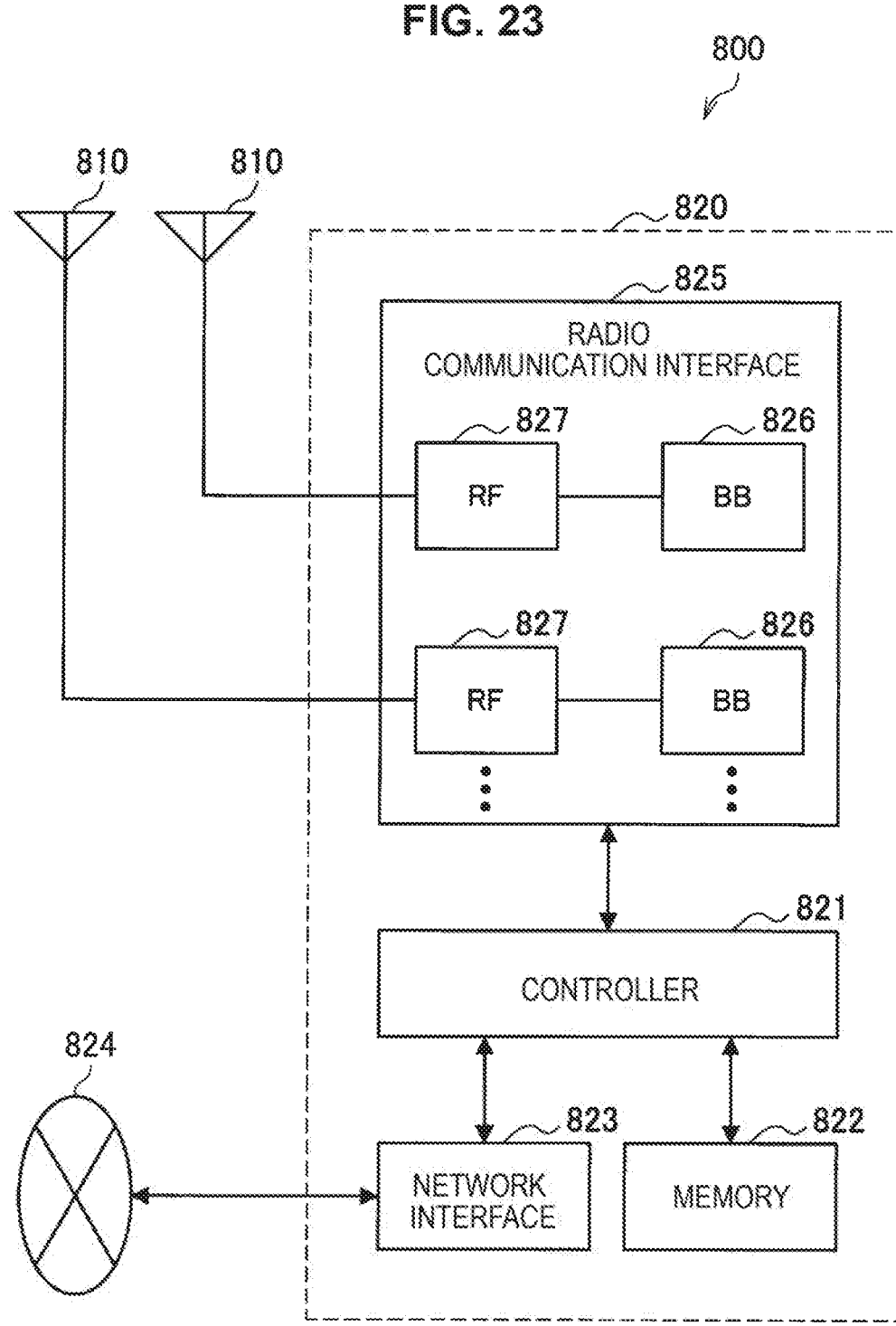
FIG. 23 is a block diagram illustrating a first example of a schematic configuration of an eNB.

FIG. 23 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 23. For example, the multiple antennas 810 may be compatible with multiple frequency bands used by the eND 800. Although FIG. 23 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical fractions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RE circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RE circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 23, one or more structural elements included in the processing unit 150 (the allocation unit 151, the selection unit 153, the information acquisition unit 155, the reporting unit 157, and/or the communication processing unit 159) described with reference to FIG. 10 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 23, the radio communication unit 120 described with reference to FIG. 10 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 24:
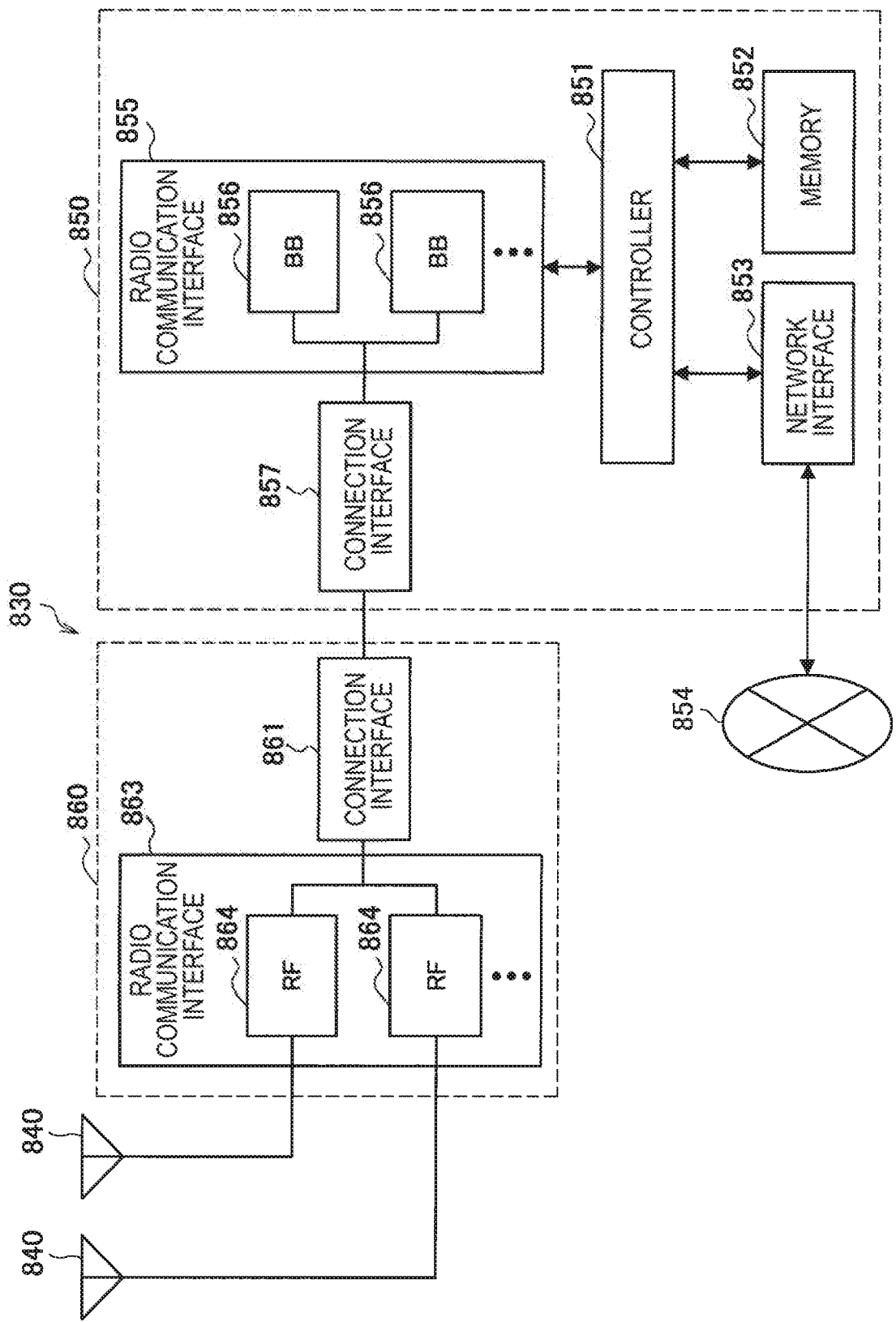
FIG. 24 is a block diagram illustrating a second example of the schematic configuration of the eNB.

FIG. 24 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included h an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNS 830 shown in FIG. 24, one or more structural elements included in the processing unit 150 (the allocation unit 151, the selection unit 153, the information acquisition unit 155, the reporting unit 157, and/or the communication processing unit 159) described with reference to FIG. 10 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 10:
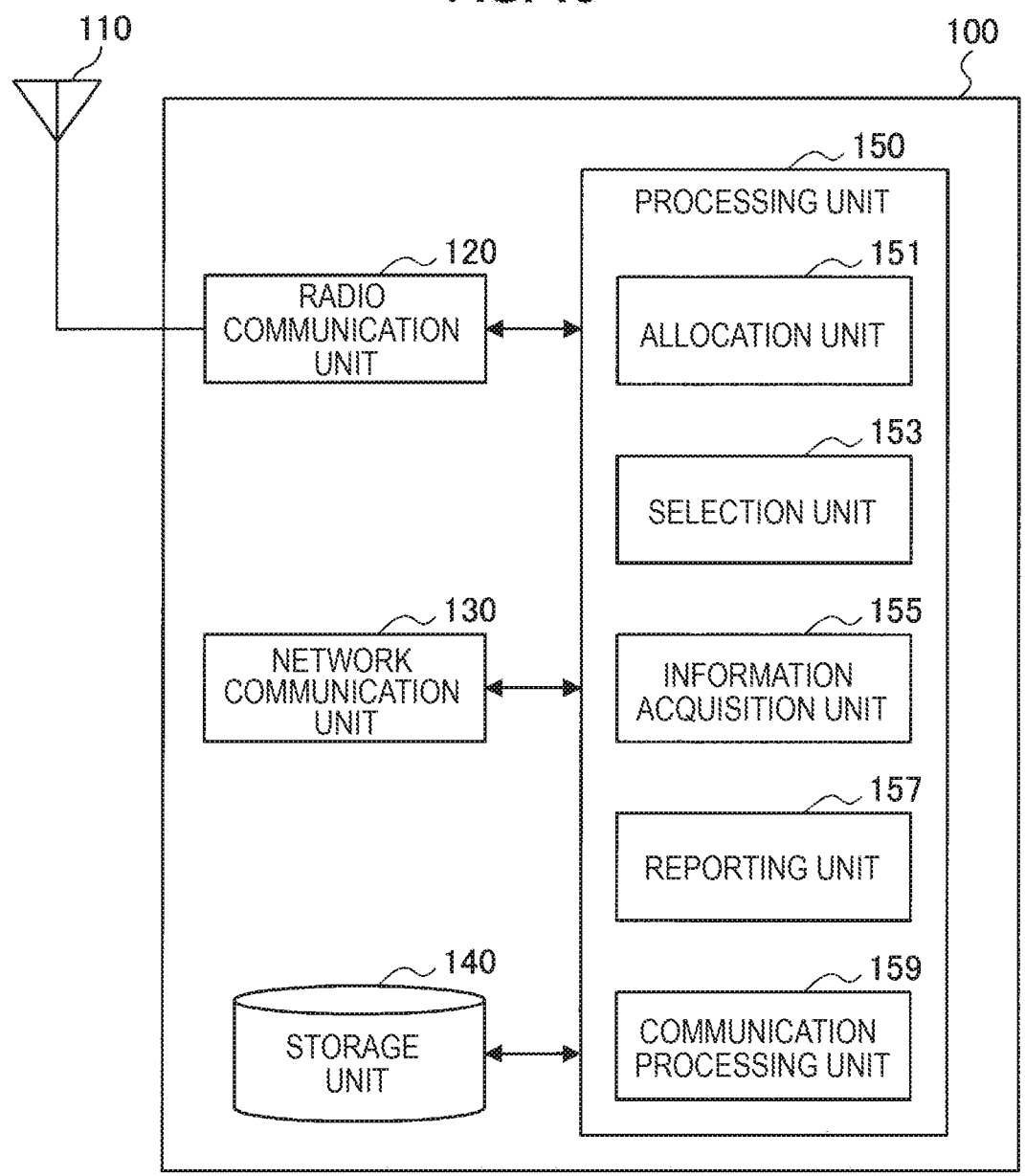
FIG. 10 is a block diagram illustrating an example of a configuration of a base station according to the embodiment.

In addition, in the eNB 830 shown in FIG. 24, the radio communication unit 120 described, for example, with reference to FIG. 10 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

6.2. Application Examples with Regard to Terminal Device

First Application Example

Figure 25:
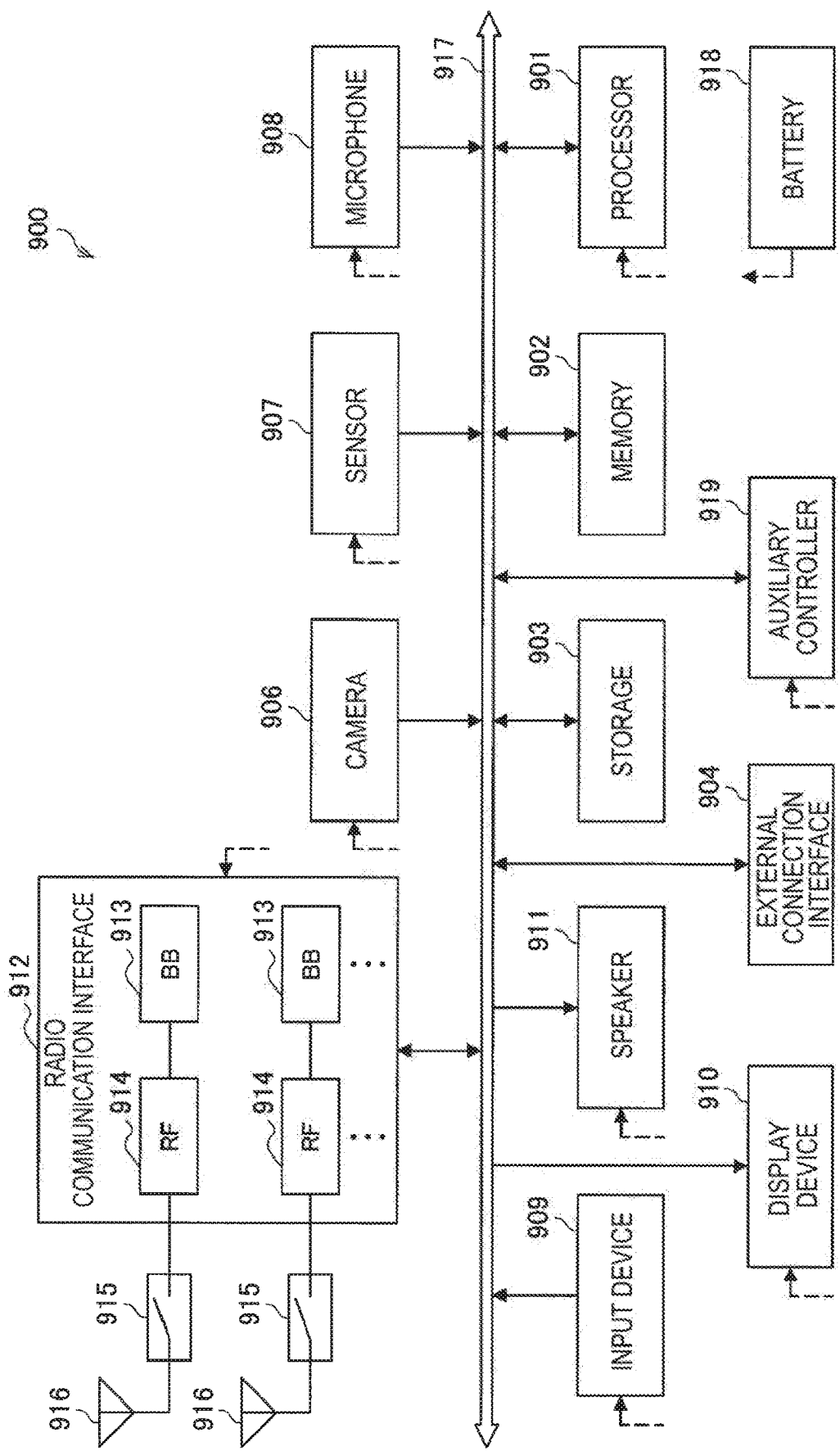
FIG. 25 is a block diagram illustrating, an example of a schematic configuration of a smartphone.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and art organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 913 includes the multiple BB processors 913 and the multiple RF circuits 914, the radio communication interface 912 may also include a single BB processor 913 or a single RE circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in a MIMO antenna), and is used for the radio communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 shown in FIG. 25, the information acquisition unit 241 and the communication processing unit 243 described with reference to FIG. 11 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

Figure 11:
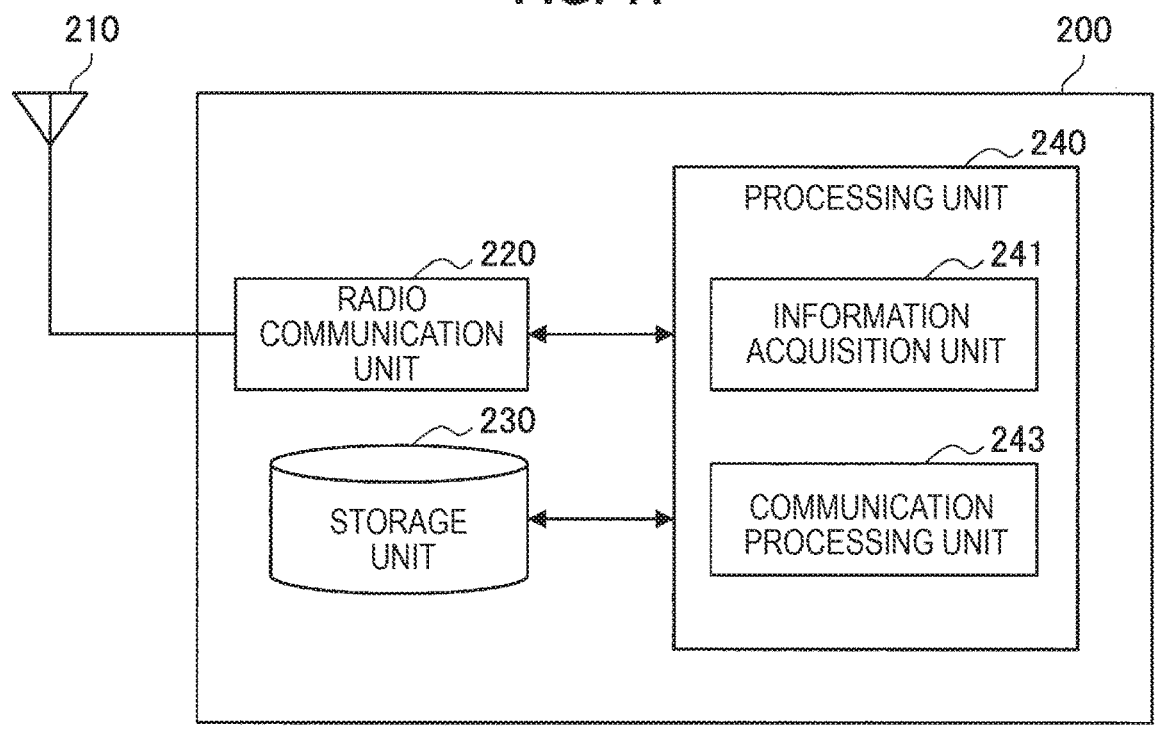
FIG. 11 is a block diagram illustrating an example of a configuration of a terminal device according to the embodiment.

In addition, in the smartphone 900 shown in FIG. 25, the radio communication unit 220 described, for example, with reference to FIG. 11 may be implemented by the radio communication interface 912 (for example, the RF circuit 914). Moreover, the antenna unit 210 may be implemented by the antenna 916.

Second Application Example

Figure 26:
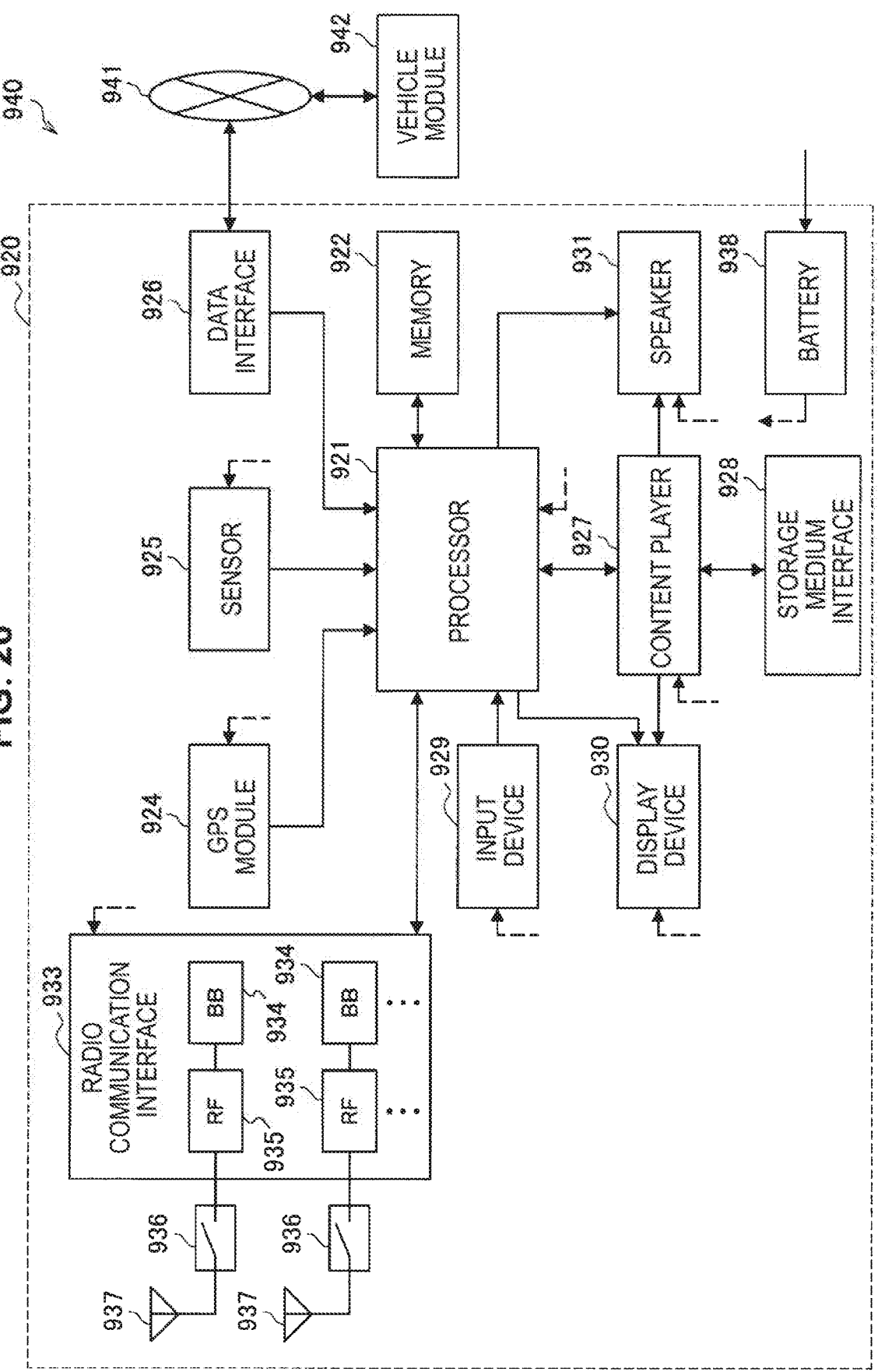
FIG. 26 is a block diagram illustrating an example of a schematic configuration of a car navigation device.

FIG. 26 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 26. Although FIG. 26 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 26 via feeder lines that are partially shown as dashed lines in the figure. The battery 938 accumulates power supplied form the vehicle.

In the car navigation device 920 shown in FIG. 26, the information acquisition unit 241 and the communication processing unit 243 described with reference to FIG. 11 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the car navigation device 920, and the radio communication interface 933 (for example, the BB processor 934) and/or the controller 921 may execute the program. As described above, the car navigation device 920 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

In addition, in the car navigation device 920 shown in FIG. 26, the radio communication unit 220 described, for example, with reference to FIG. 11 may be implemented by the radio communication interface 933 (for example, the RF circuit 935). Moreover, the antenna unit 210 may be implemented by the antenna 937.

The technology of the present disclosure may also be realized as an in-vehicle system or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and the communication processing unit 243. The vehicle module 942 generates vehicle data such as vehicle speed, engine speed, and trouble information, and outputs the generated data to the in-vehicle network 941.

7. Conclusion

So far, devices and processes according to the embodiment of the present disclosure have been described with reference to FIGS. 9 to 26.

According to the embodiment of the present disclosure, the terminal device 200 acquires the information that the base station 100 will refer to in order to select a codebook group and transmits the acquired information to the base station 100 as the codebook indication.

With this configuration, the base station 100 can select a more preferable codebook by using the information of the codebook indication from the terminal device 200 as reference information.

In addition, according to the embodiment of the present disclosure, the base station 100 may apply a reference signal (SCMA-RS), which is generated by performing SCMA modulation on a sequence of each layer on the basis of the codebook, as a reference signal for the codebook indication.

With this configuration the terminal device 200 can measure channel information more accurately even in a situation in which levels of signals are uneven as in, for example, SCMA. That is, according to the embodiment of the present disclosure, the terminal device 200 can give a more preferable codebook indication to the base station 100.

Accordingly, for example, the base station 100 can determine whether SCMA communication is to be performed, which codebook that generates a 4-dimensional or a 6-dimensional constellation should be used, or the like with reference to the codebook indication from the terminal device 200. In addition, as another example, even in a case in which the base station 100 uses a codebook for generating a 4-dimensional constellation, the base station can select a codebook for generating a more preferable constellation from a plurality of candidates in accordance with a condition of a communication channel.

The preferred embodiment(s) of the present disclosure has/have been described above with reference to the accompanying drawings, whilst the present disclosure is not limited to the above examples. A person with common knowledge in the technical field of the present disclosure may find various alterations and modifications within the scope of the appended claims, and it should be understood that they will naturally come under the technical scope of the present disclosure.

Processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the allocation unit, the selection unit, the information acquisition unit, the reporting unit, and/or the communication processing unit) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the allocation unit, the selection unit, the information acquisition unit, the reporting unit, and/or the communication processing unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A device including:
a communication unit configured to perform radio communication; and
a control unit configured to causes a transmission unit to transmit information regarding a codebook for multi-dimensionally modulating input data into a codeword, to a base station.

(2)
The device according to (1), in which the control unit acquires the information on the basis of a reference signal transmitted from the base station.

(3)
The device according to (2), in which the control acquires the information on the basis of the reference signal allocated to a plurality of radio resources and transmitted.

(4)
The device according to (3), in which the control unit acquires the information on the basis of a codeword demodulated on the basis of a codebook allocated in advance, from the reference signal allocated to the plurality of radio resources and transmitted.

(5)
The device according to any of (2) to (4), in which the control unit causes the transmission unit to transmit information indicating a signal-to-noise ratio measured with respect to the reference signal, to the base station.

(6)
A device including:
an acquisition unit configured to acquire information regarding a codebook for multi-dimensionally modulating input data into a codeword, from a terminal; and
a selection unit configured to select the codebook after the information is acquired.

(7)
The device according to (6), in which the selection unit selects the codebook on the basis of the acquired information.

(8)
The device according to (6) or (7), including
a transmission control unit configured to cause a transmission unit to transmit a reference signal to be used by the terminal to acquire the information, to the terminal.

(9)
The device according to (8), including
a storage unit configured to store the reference signal, which is generated by multiplexing, for each of radio resources serving as an allocation destination, a plurality of elements included in a codeword generated for each of a plurality of different codebooks by multi-dimensionally modulating a sequence on the basis of the codebooks,
in which the transmission control unit allocates the reference signals stored in the storage unit and corresponding to the radio resources, to the plurality of radio resources.

(10)
The device according to (9), in which the codeword is generated by multi-dimensionally modulating the existing sequence on the basis of the codebooks.

(11)
The device according to (9) or (10), in which the transmission control unit allocates the respective reference signals generated on the basis of the codebooks included in different codebook groups to the radio resources included in different resource blocks.

(12)
The device according to (11), in which the different resource blocks are resource blocks allocated to different frequency bands.

(13)
The device according to (11), in which the different resource blocks are resource blocks allocated to different subframes.

(14)
The device according to (9), in which an initial value of the sequence includes identification information of the codebook for converting the sequence into the codeword.

(15)
The device according to (9), in which an initial value of the sequence includes identification information of a codebook group that includes the codebooks for converting the sequence into the codeword.

(16)
A method including
causing, by a processor, a transmission unit to transmit information regarding a codebook for multi-dimensionally modulating input data into a codeword, to a base station.

(17)
A method to be used by a processor, the method including:
acquiring information regarding a codebook for multi-dimensionally modulating input data into a codeword, from a terminal; and
selecting the codebook after the information is acquired.

(18)
A program causing a computer to
cause a transmission unit to transmit information regarding a codebook for multi-dimensionally modulating input data into a codeword, to a base station.

(19)
A program causing a computer to perform:
acquisition of information regarding a codebook for multi-dimensionally modulating input data into a codeword, from a terminal; and
selection of the codebook alter the information is acquired.

REFERENCE SIGNS LIST 1 system
100 base station
101 cell
110 antenna unit
120 radio communication unit
130 network communication unit
140 storage unit
150 processing unit
151 allocation unit
153 selection unit
155 information acquisition unit
157 reporting unit
159 communication processing unit
200 terminal device
210 antenna unit
220 radio communication unit
230 storage unit
240 processing unit
241 information acquisition unit
243 communication processing unit

The invention claimed is:

1. A device comprising:
storage circuitry configured to store codebook information;
antenna circuitry configured to transmit radio waves in accordance to signals directed from processing circuitry, and configured to convert radio waves to signals directed to the processing circuitry;
the processing circuitry configured to perform radio communications; and
the processing circuitry configured to perform control such that information regarding a preferred codebook for multi-dimensionally modulating input data into a codeword is transmitted from the processing circuitry to a base station;
wherein the processing circuitry is configured to transmit the information after successive receipt, from the base station to the device, of a request for codebook indication and a Sparse Code Multiple Access Reference Signal (SCMA-RS);
wherein the request for codebook indication included a resource block to be used during reception of the SCMA-RS;
wherein the SCMA-RS was received in a user data region; and
the processing circuitry is configured to perform the radio communications in accordance with the preferred codebook.

2. The device according to claim 1, wherein the user data region is a Physical Downlink Shared Channel (PDSCH).

3. The device according to claim 2, wherein the processing circuitry is configured to acquire the information on the basis of a reference signal allocated to a plurality of radio resources and transmitted.

4. The device according to claim 3, wherein the control circuitry is configured to acquire the information on the basis of a codeword demodulated on the basis of a codebook allocated in advance, from the reference signal allocated to the plurality of radio resources and transmitted.

5. The device according to claim 2, further comprising communication circuitry, wherein the processing circuitry is configured to perform control such that information indicating a signal-to-noise ratio measured with respect to a reference signal is transmitted from the communication circuitry to a base station.

6. The device according to claim 1, wherein the SCMA-RS was transmitted with a transmission power of the SCMA-RS set to a lower level than a transmission power of a Cell Specific Reference Signal (CRS).

7. A device comprising:
storage circuitry;
antenna circuitry configured to transmit radio waves in accordance to signals directed from processing circuitry, and configured to convert radio waves to signals directed to the processing circuitry;
the processing circuitry configured to perform radio communications;
the processing circuitry configured to successively transmit a request for codebook indication and a Sparse Code Multiple Access Reference Signal (SCMA-RS), to the terminal;
wherein the request for codebook indication included a resource block to be used during transmission of the SCMA-RS;
wherein the SCMA-RS was transmitted in a user data region;
the processing circuitry configured to receive a codebook indication message, the processing circuitry including acquisition circuitry configured to acquire information from the codebook indication message regarding a preferred codebook for multi-dimensionally modulating input data into a codeword, from the terminal;
selection circuitry configured to select the preferred codebook after the information is acquired; and
the processing circuitry configured to perform the radio communications in accordance with the preferred codebook.

8. The device according to claim 7, wherein the user data region is a Physical Downlink Shared Channel (PDSCH).

9. The device according to claim 7, comprising
transmission control circuitry configured to transmit a reference signal, to be used by the terminal to acquire the information, to the terminal.

10. The device according to claim 9, comprising
storage circuitry configured to store the reference signal, which is generated by multiplexing, for each of radio resources serving as an allocation destination, a plurality of elements included in a codeword generated for each of a plurality of different codebooks by multi-dimensionally modulating a sequence on the basis of the codebooks, wherein the transmission control circuitry is configured to allocate reference signals stored in the storage circuitry and corresponding to the radio resources, to the plurality of radio resources.

11. The device according to claim 10, wherein the codeword is generated by multi-dimensionally modulating the existing sequence on the basis of codebooks.

12. The device according to claim 10, wherein the transmission control circuitry is configured to allocate the respective reference signals generated on the basis of the codebooks included in different codebook groups to the radio resources included in different resource blocks.

13. The device according to claim 12, wherein the different resource blocks are resource blocks allocated to different frequency bands.

14. The device according to claim 12, wherein the different resource blocks are resource blocks allocated to different subframes.

15. The device according to claim 10, wherein an initial value of the sequence includes identification information of the codebook for converting the sequence into the codeword.

16. The device according to claim 10, wherein an initial value of the sequence includes identification information of a codebook group that includes the codebooks for converting the sequence into the codeword.

17. The device according to claim 7, wherein the SCMA-RS was transmitted with a transmission power of the SCMA-RS set to a lower level than a transmission power of a Cell Specific Reference Signal (CRS).

18. A method comprising:
performing radio communication including transmitting radio waves in accordance to signals directed from processing circuitry, and receiving radio waves directed to the processing circuitry;
the transmitting and receiving including:
after successive receipt of a request for codebook indication and a Sparse Code Multiple Access Reference Signal (SCMA-RS) from a base station, transmitting information regarding a preferred codebook for multi-dimensionally modulating input data into a codeword to the base station;
wherein the request for codebook indication included an indication of a resource block to be used in the receiving of the SCMA-RS from a base station; and
wherein the SCMA-RS was received in a user data region; and
performing radio communications in accordance with the preferred codebook.

19. The method according to claim 18, wherein the user data region is a Physical Downlink Shared Channel (PDSCH).

20. The method according to claim 18, wherein the SCMA-RS was transmitted with a transmission power of the SCMA-RS set to a lower level than a transmission power of a Cell Specific Reference Signal (CRS).

* * * * *